United States Patent [19]
Dowling

[11] Patent Number: 5,943,063
[45] Date of Patent: Aug. 24, 1999

[54] METHOD AND APPARATUS FOR RENDERING CHARACTERS

[75] Inventor: Terence S. Dowling, San Jose, Calif.

[73] Assignee: Adobe Systems, Inc., Mountain View, Calif.

[21] Appl. No.: 08/547,562

[22] Filed: Oct. 23, 1995

[51] Int. Cl.⁶ .................................................. G06T 1/00
[52] U.S. Cl. ........................ 345/471; 345/436; 345/147; 345/428
[58] Field of Search .................................. 395/167, 168, 395/169, 170, 141, 142, 143; 345/428, 441–443, 467–472, 132, 147, 439, 136

[56] References Cited

U.S. PATENT DOCUMENTS

| | | | |
|---|---|---|---|
| 4,675,830 | 6/1987 | Hawkins | 395/138 |
| 4,907,282 | 3/1990 | Daly et al. | 383/242 |
| 5,299,308 | 3/1994 | Suzuki et al. | 395/523 |
| 5,544,294 | 8/1996 | Cho et al. | 395/141 |

FOREIGN PATENT DOCUMENTS

| | | |
|---|---|---|
| 0 590 923 | 4/1994 | European Pat. Off. . |
| 2 236 463 | 4/1991 | United Kingdom . |
| WO 94/06094 | 3/1994 | WIPO . |
| WO 94/29843 | 12/1994 | WIPO . |

*Primary Examiner*—Joseph H. Feild
*Attorney, Agent, or Firm*—Fish & Richardson P.C.

[57] ABSTRACT

A method for creating anti-aliased characters on a computer output device includes the steps of generating a call from a client process for a character to be rendered, rendering the character at a high resolution, and aligning stems of the character with a coarse grid corresponding to the resolution of an output device. The step of aligning the high resolution rendered stems to the coarse grid provides for an anti-aliased output with balanced stems. A method for rendering a character includes the steps of determining a device resolution and a number of greyscales to be displayed by a digital output device, determining a coarse grid and a high-resolution grid, developing character information concerning a character to be rendered, creating an initial bitmap of the character from the character information at the resolution of the high-resolution grid, and aligning stems of the initial bitmap with the coarse grid to create a coarse grid aligned high-resolution bitmap.

29 Claims, 19 Drawing Sheets

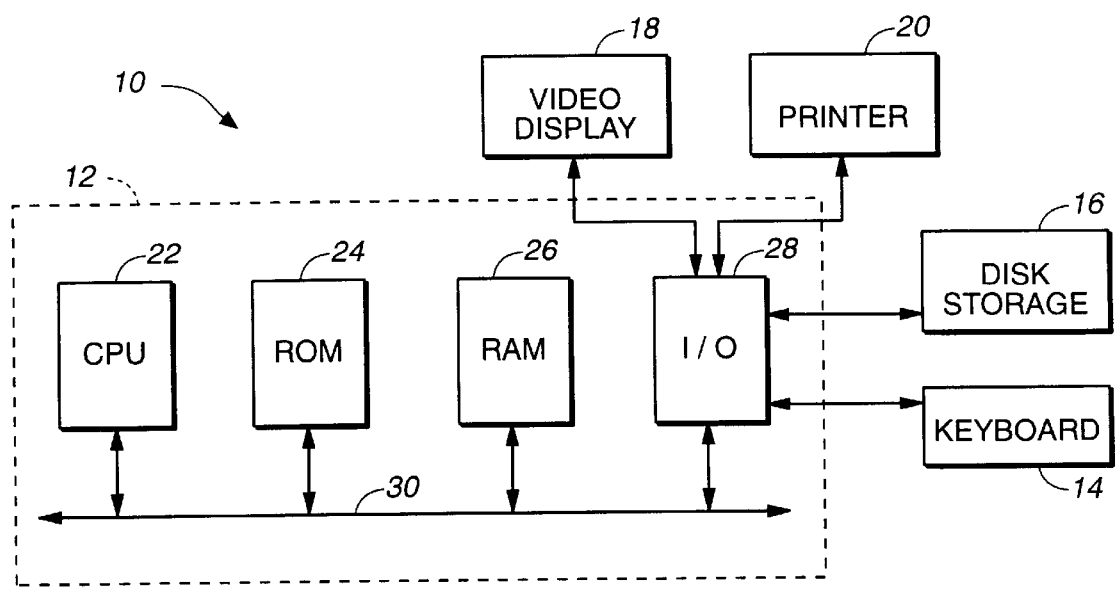
FIG._1
*(PRIOR ART)*

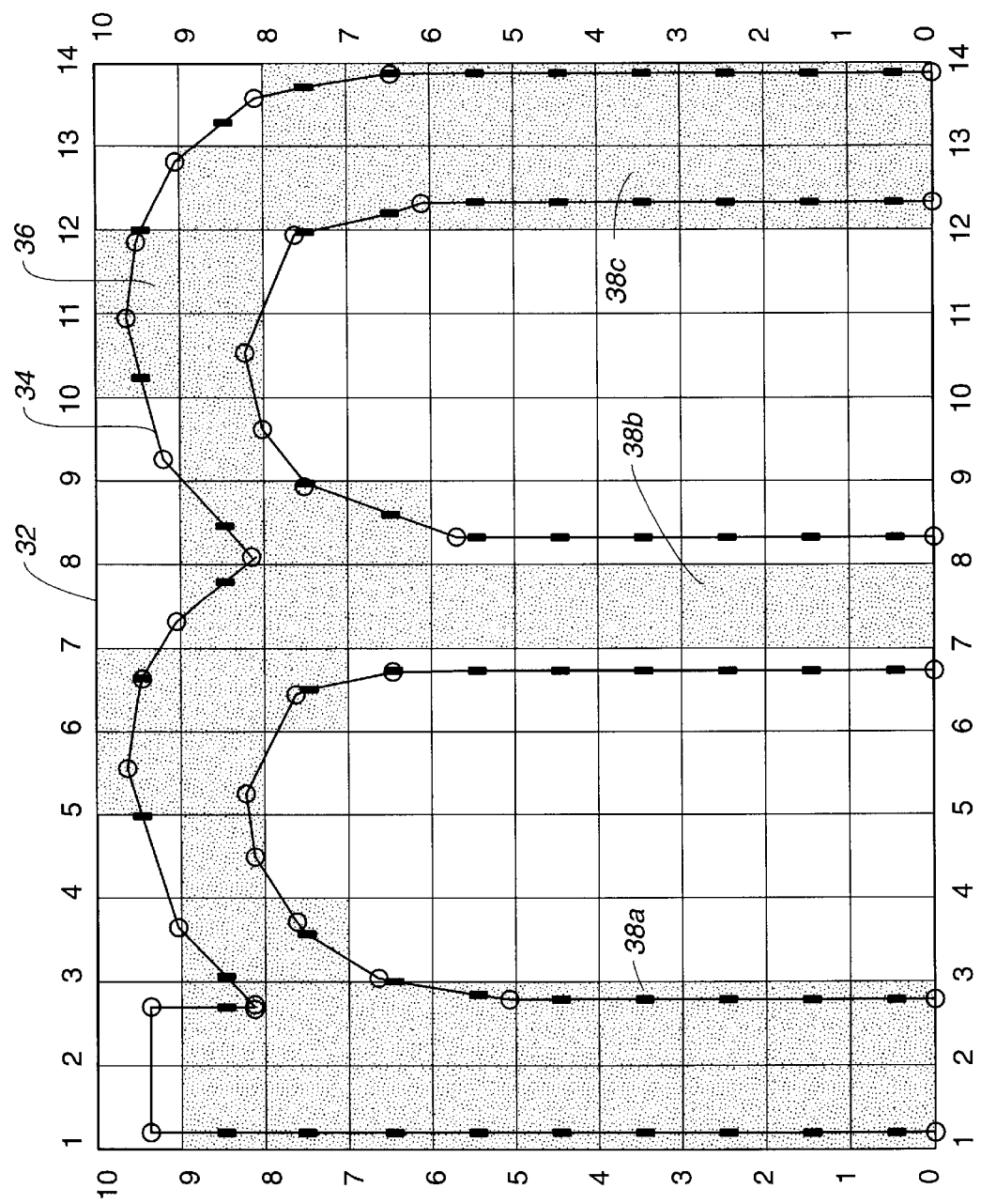
FIG._2A
(PRIOR ART)

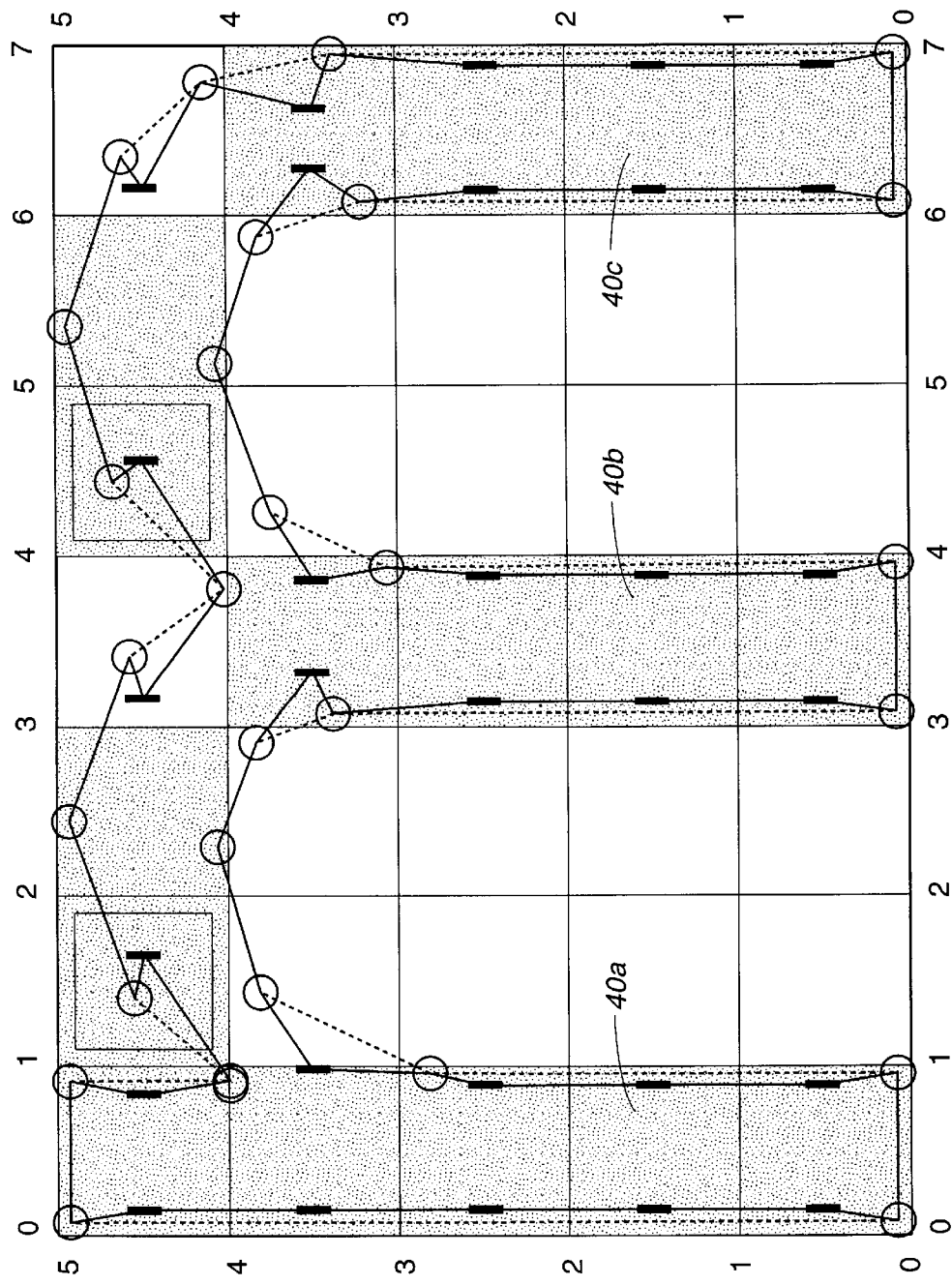
FIG._2B
(PRIOR ART)

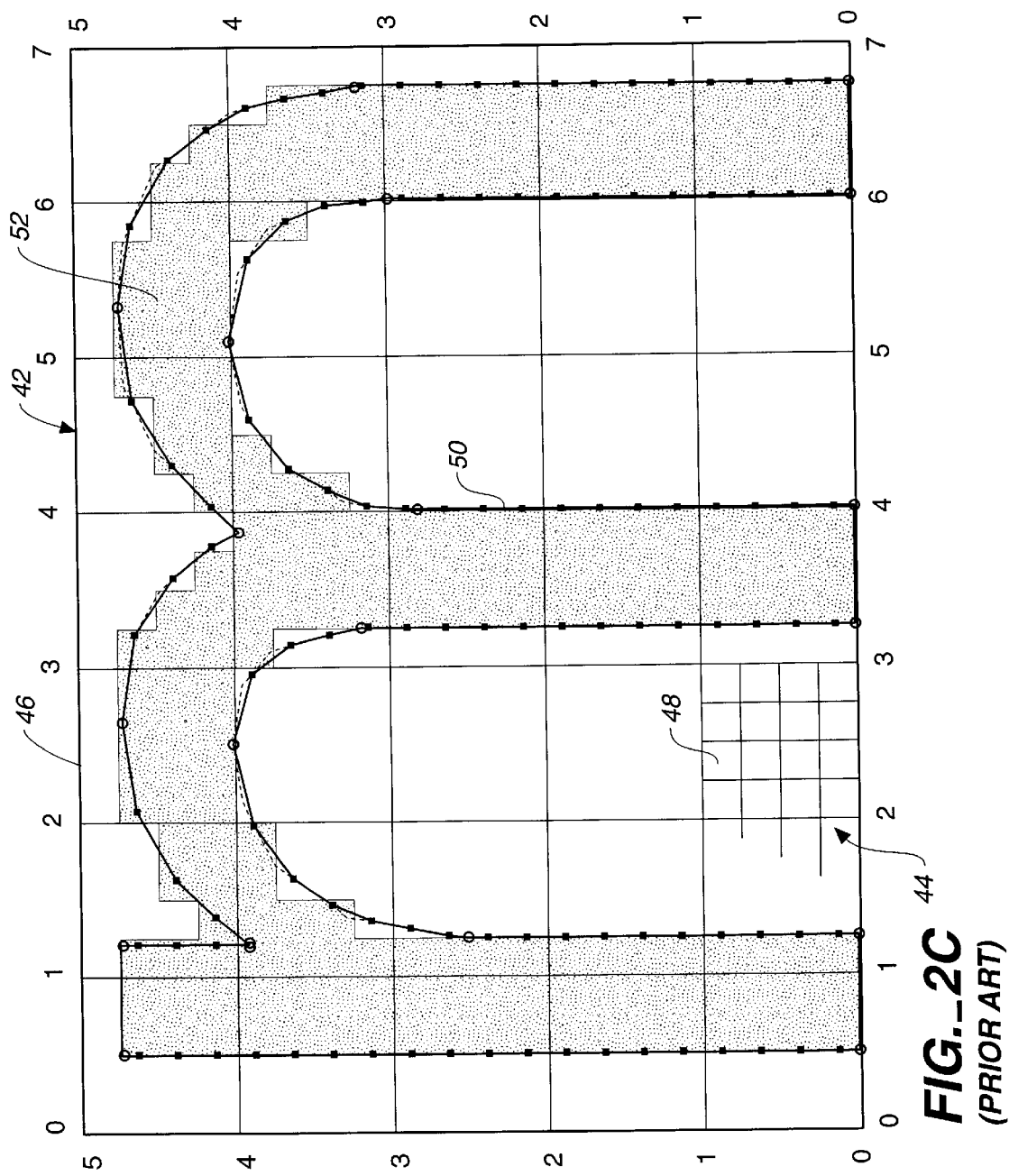
FIG._2C (PRIOR ART)

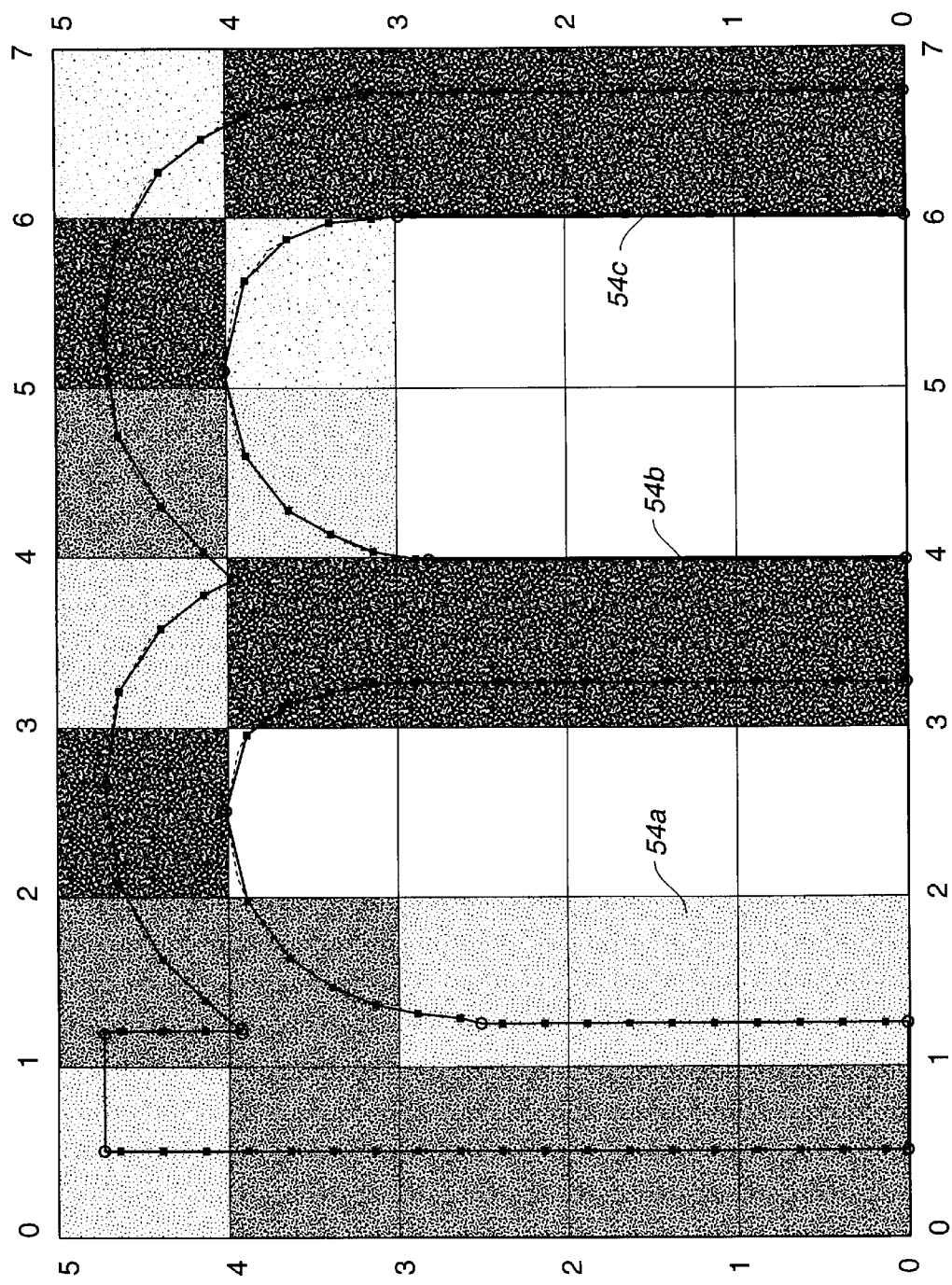
FIG._2D (PRIOR ART)

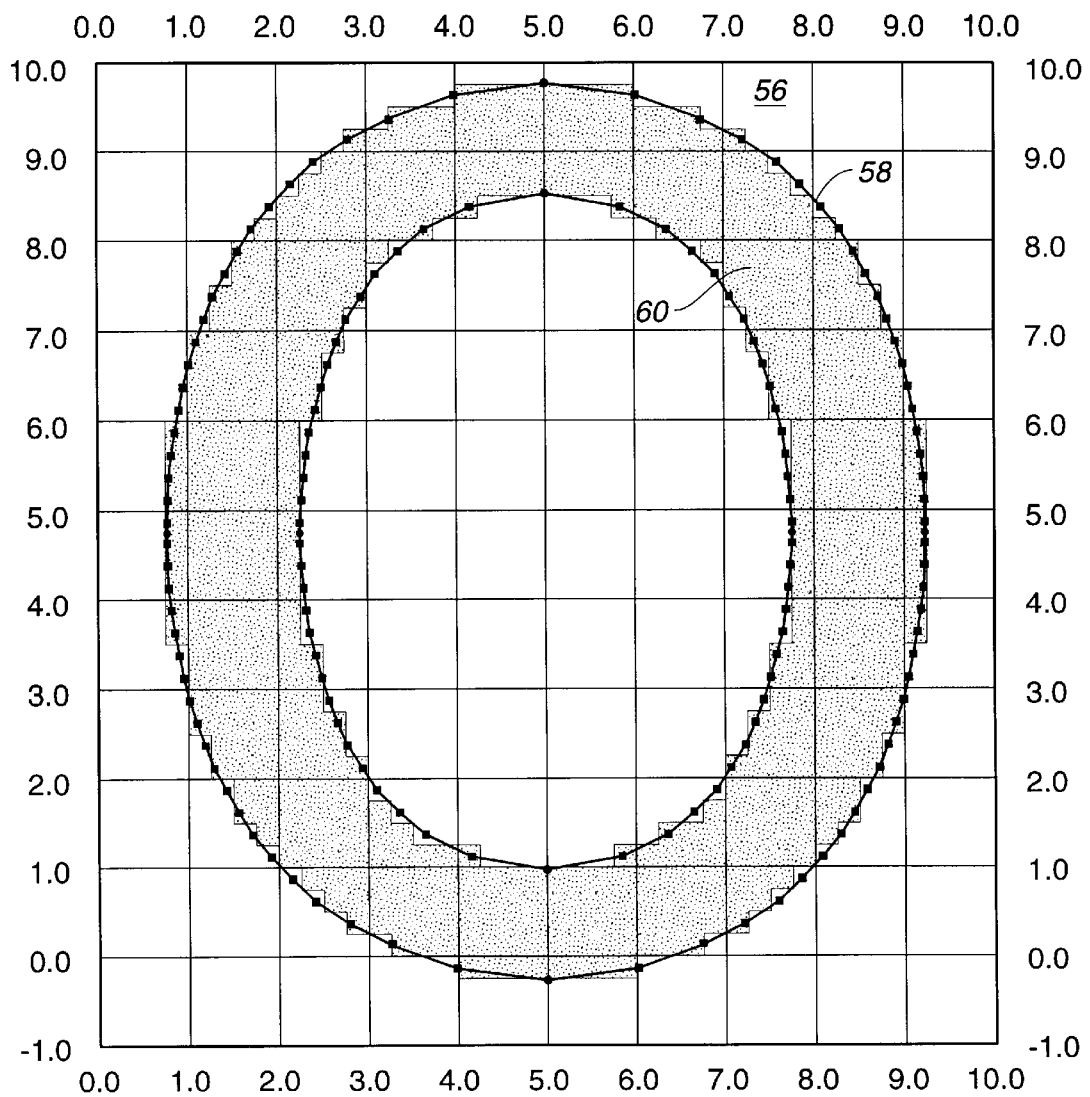
FIG._3A
*(PRIOR ART)*

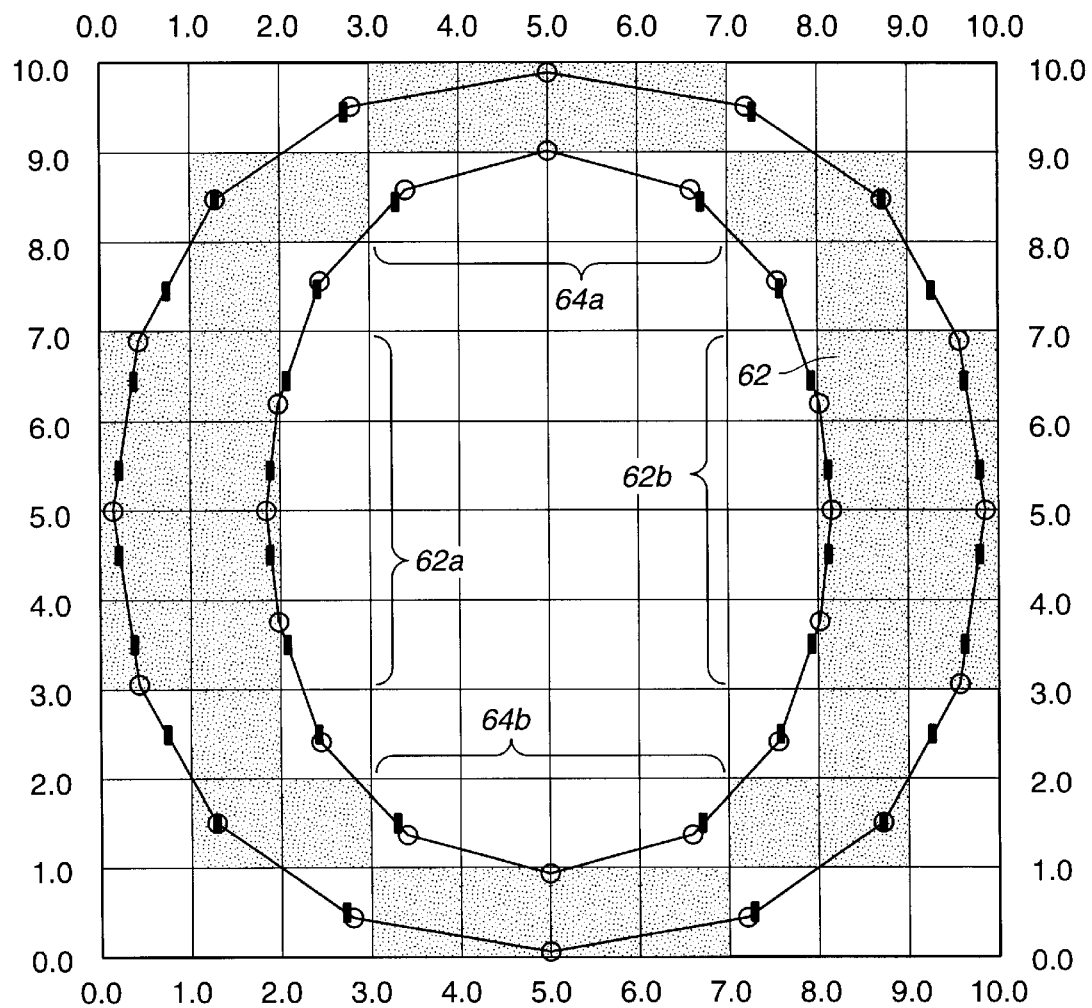
FIG._3B
*(PRIOR ART)*

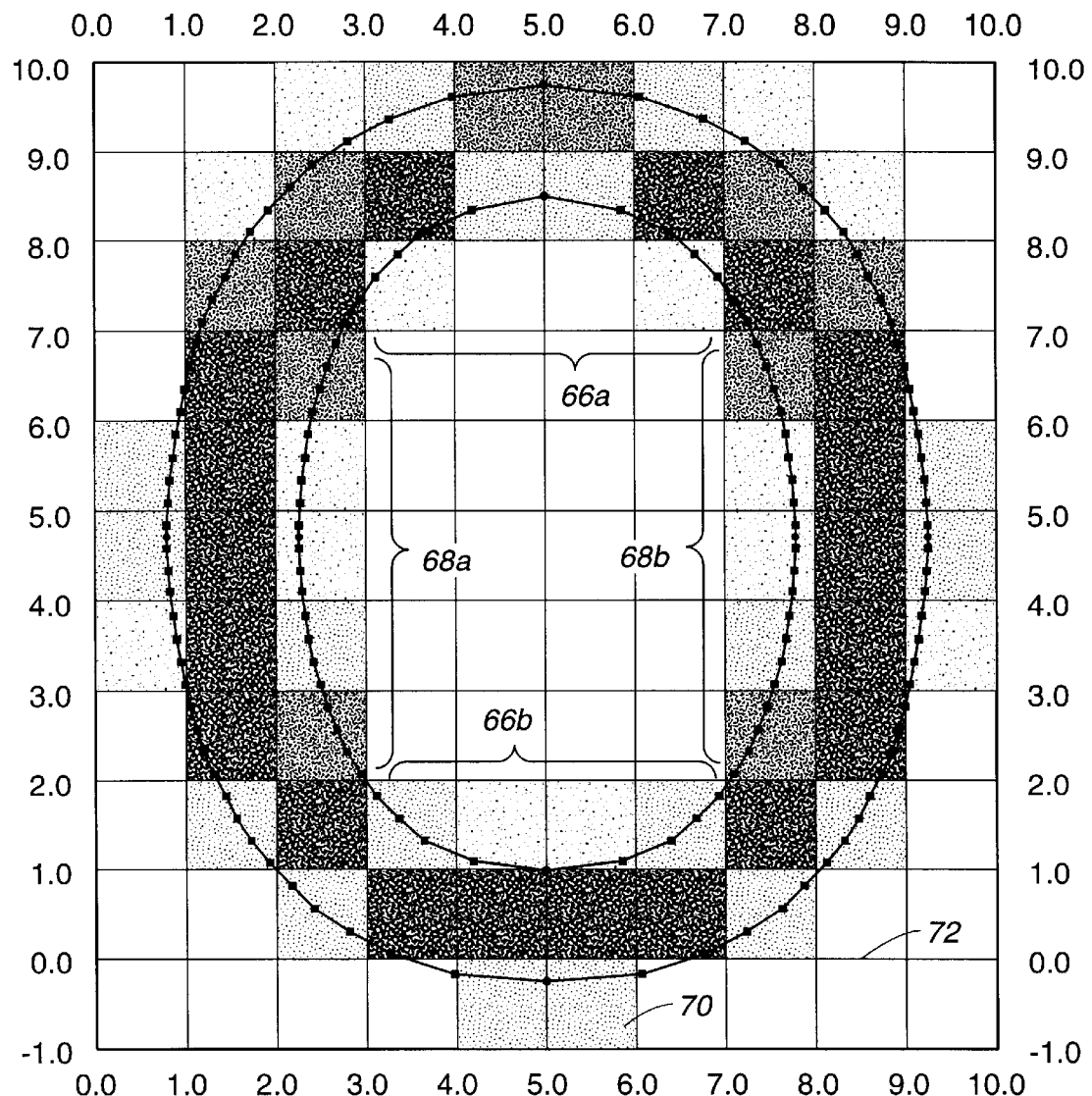
FIG._3C
*(PRIOR ART)*

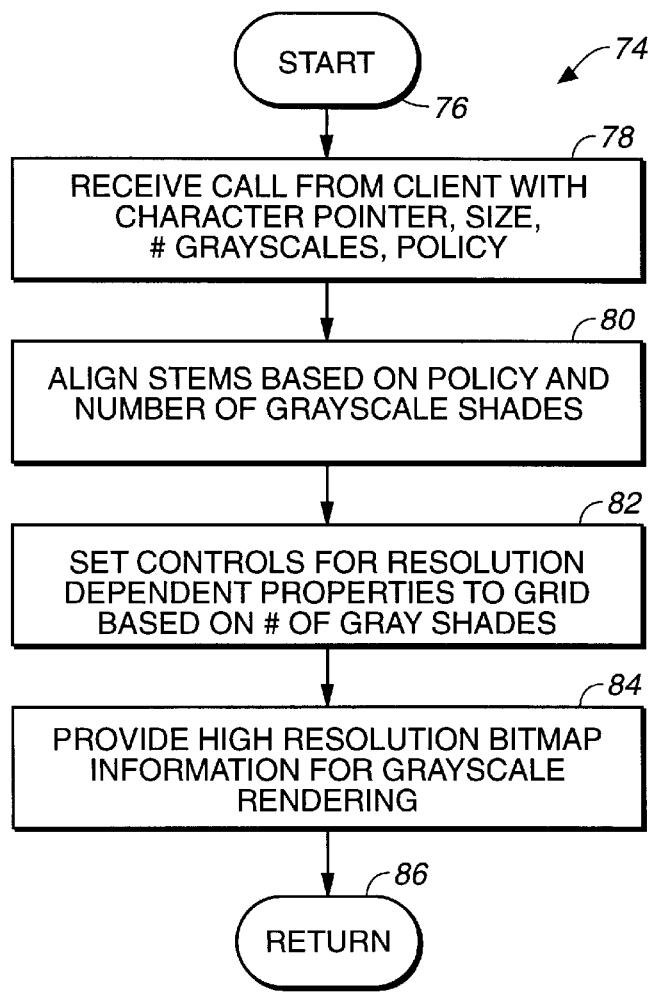
FIG._4
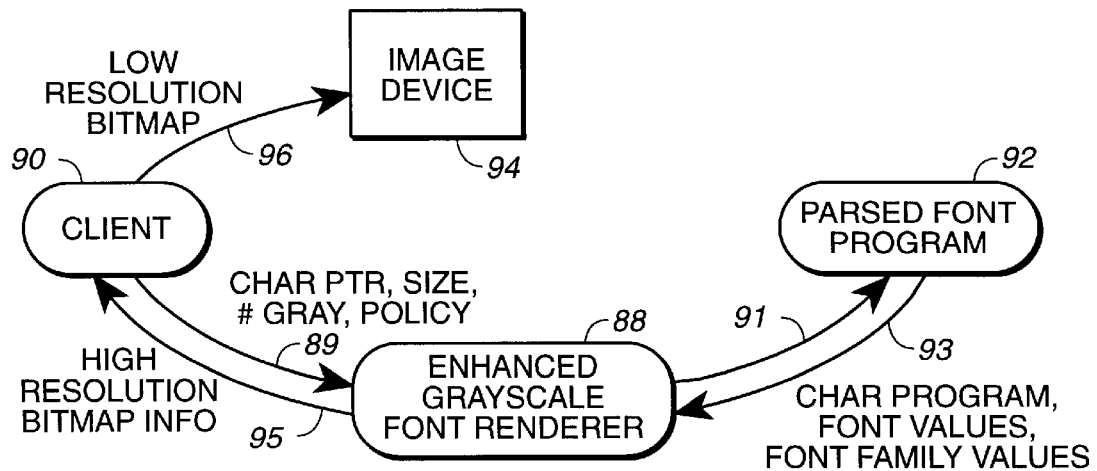
FIG._5

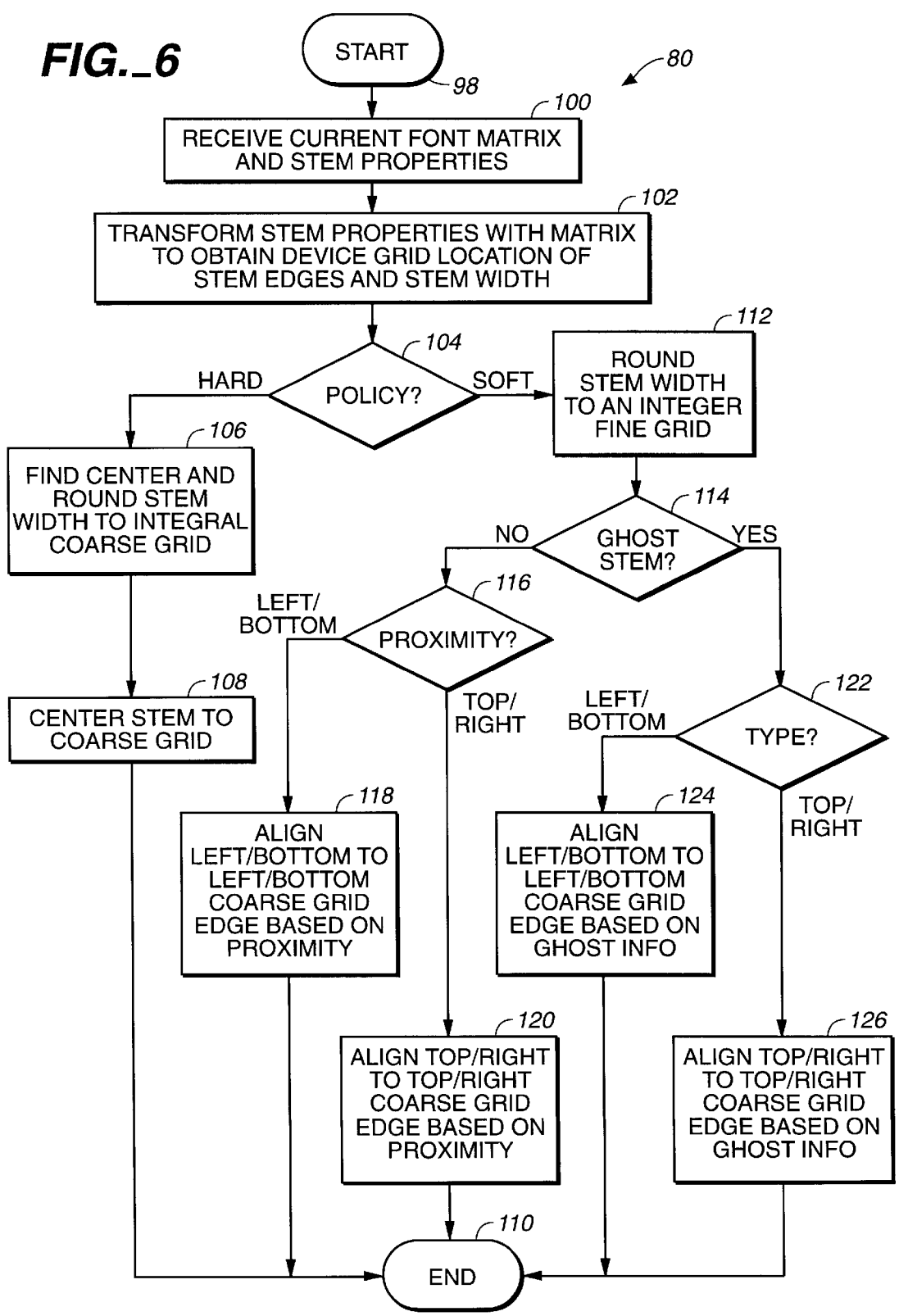
FIG._6

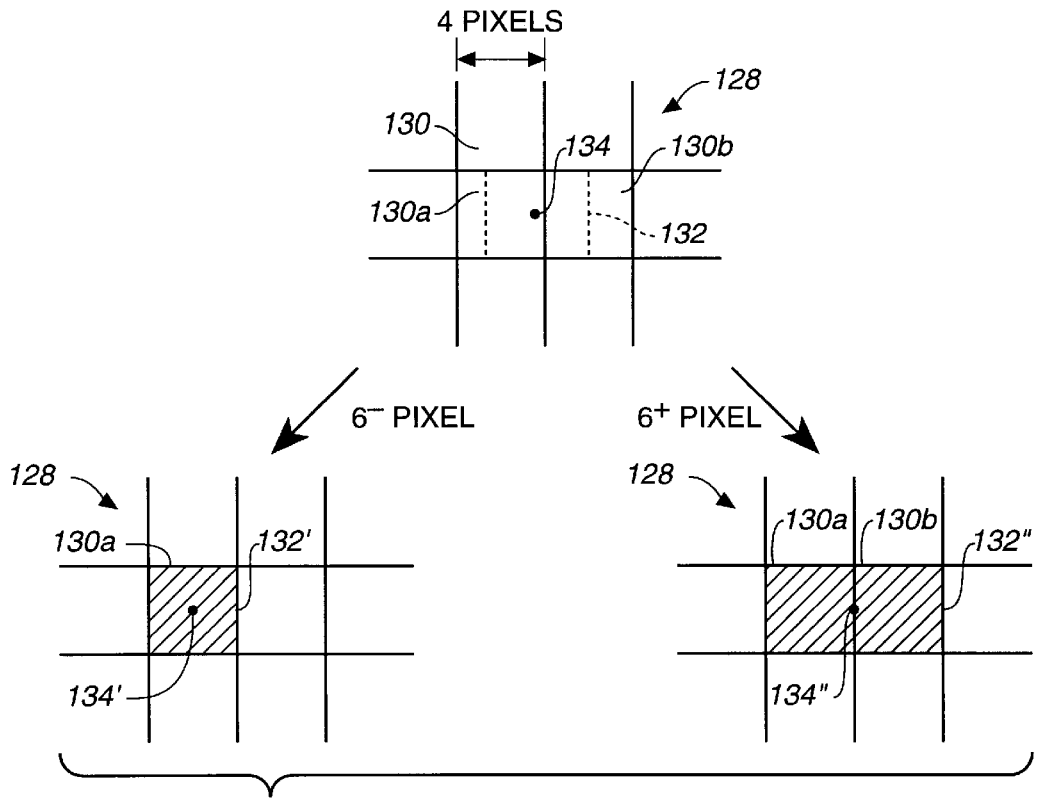
FIG._7
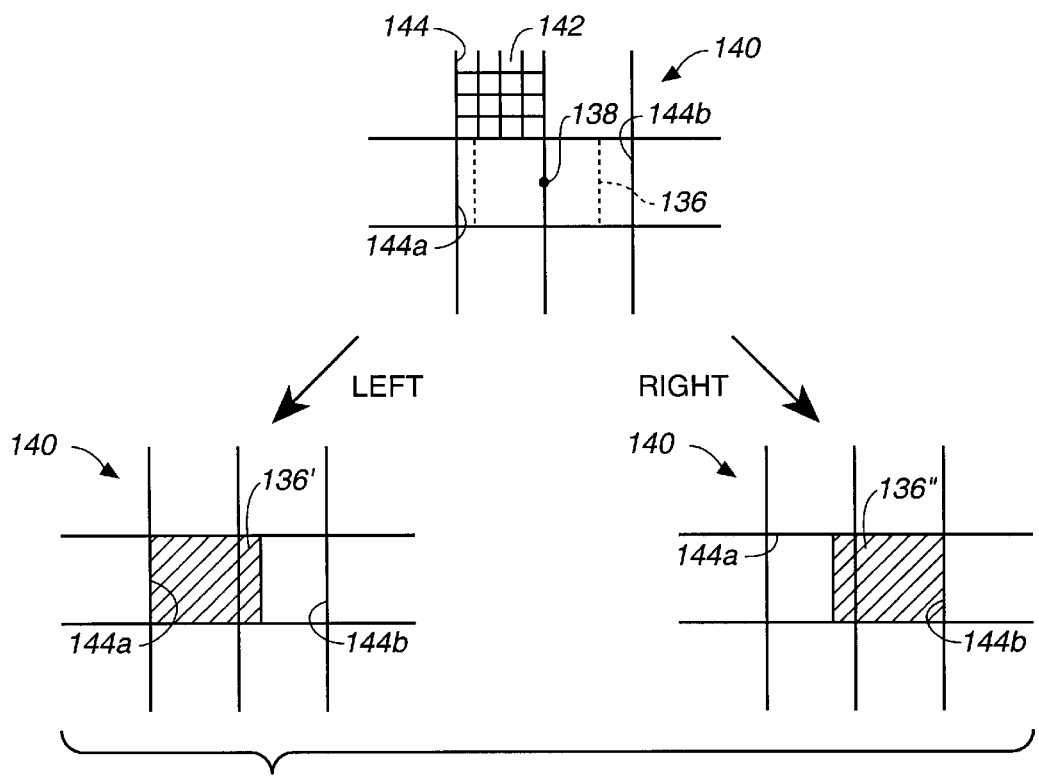
FIG._8

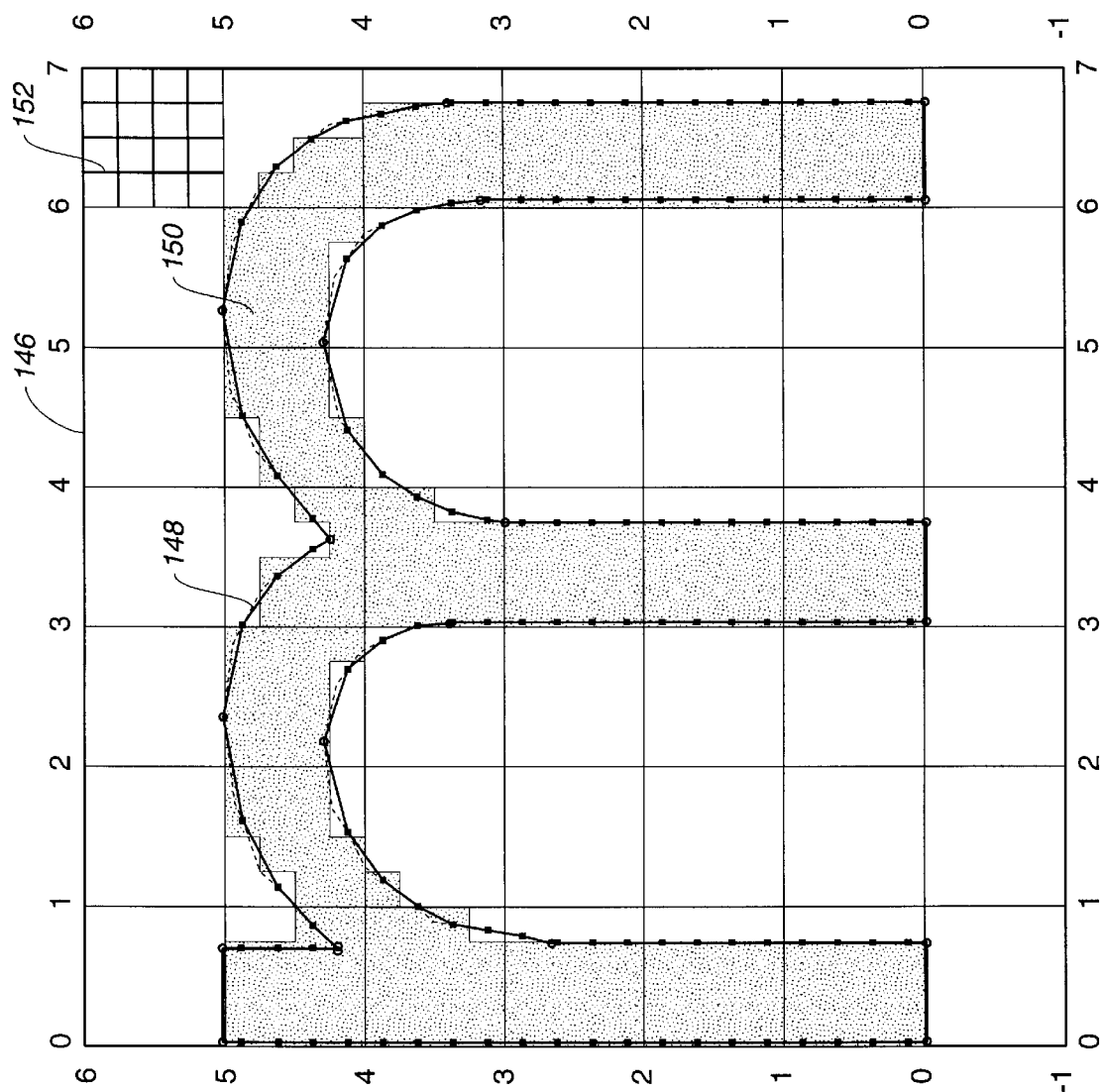
FIG._9A

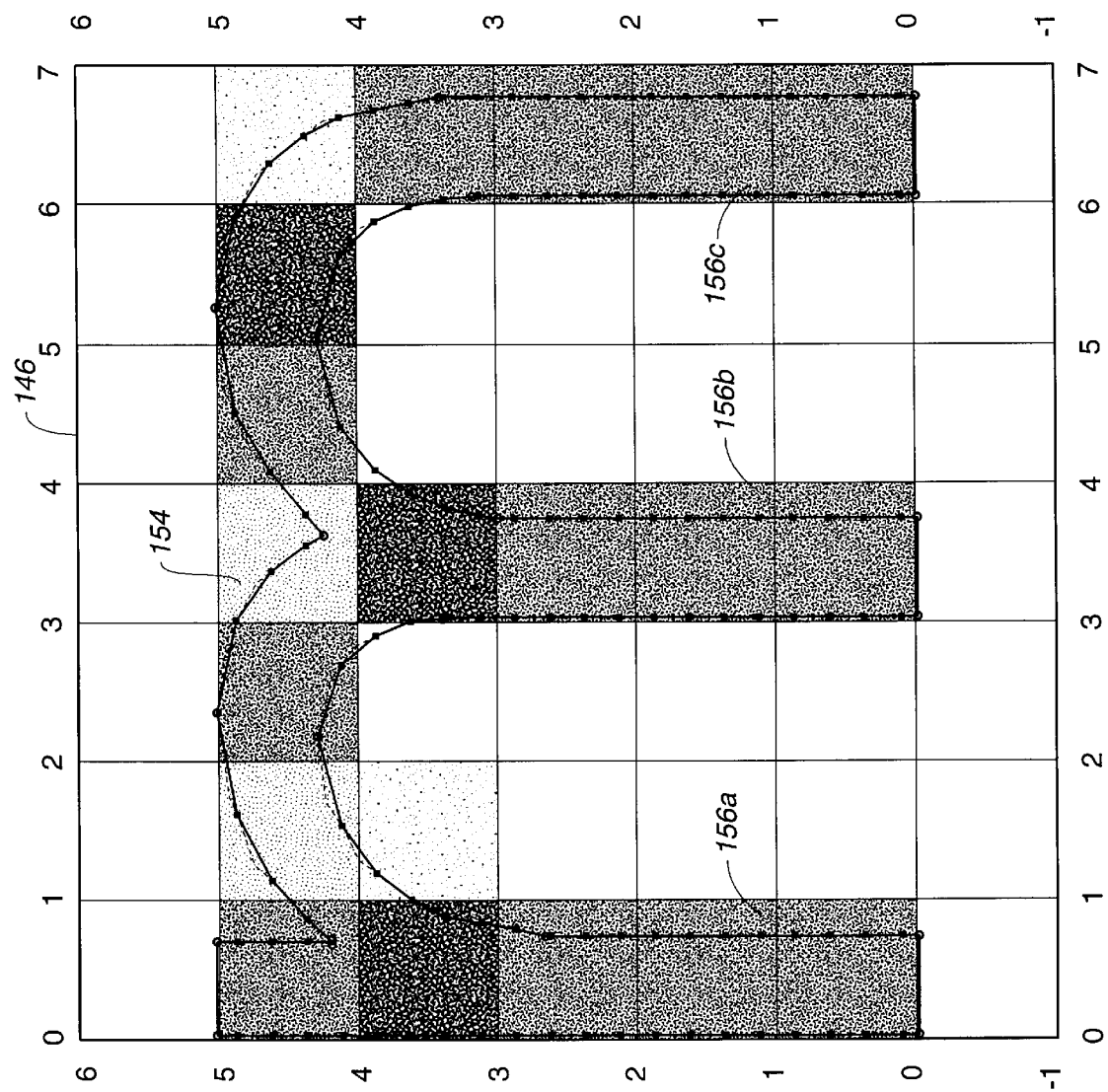
FIG._9B_-1

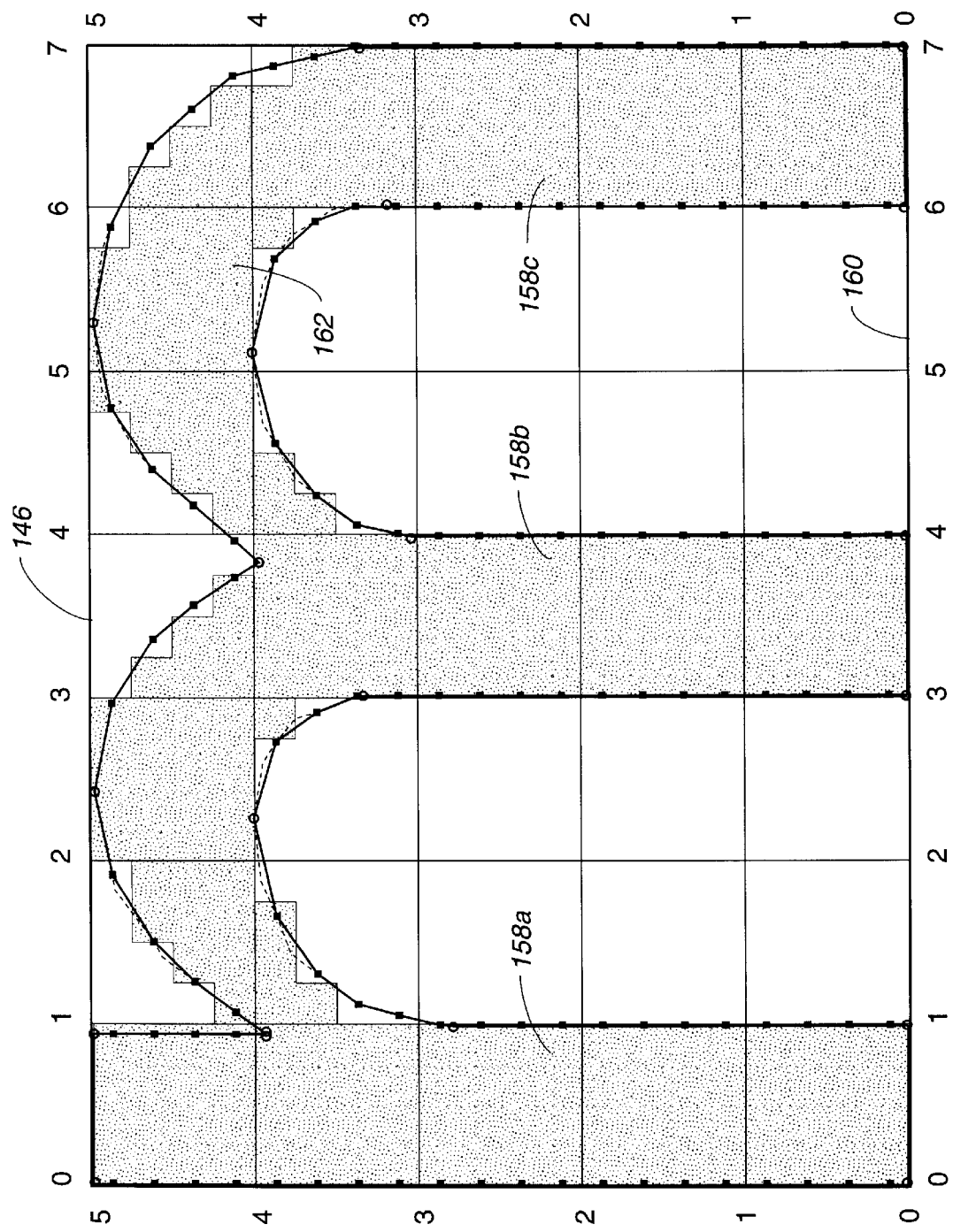
FIG._9C

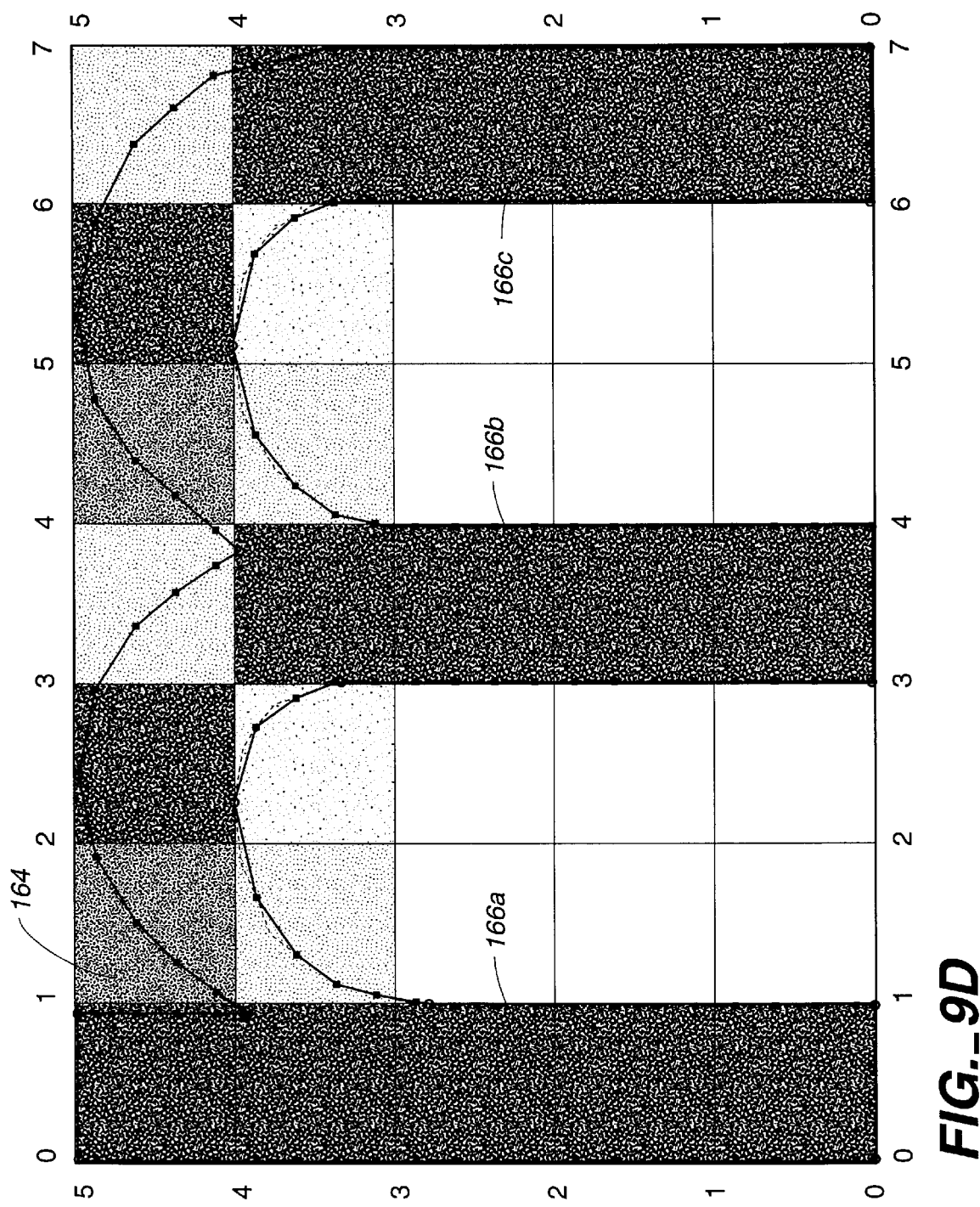
FIG._9D

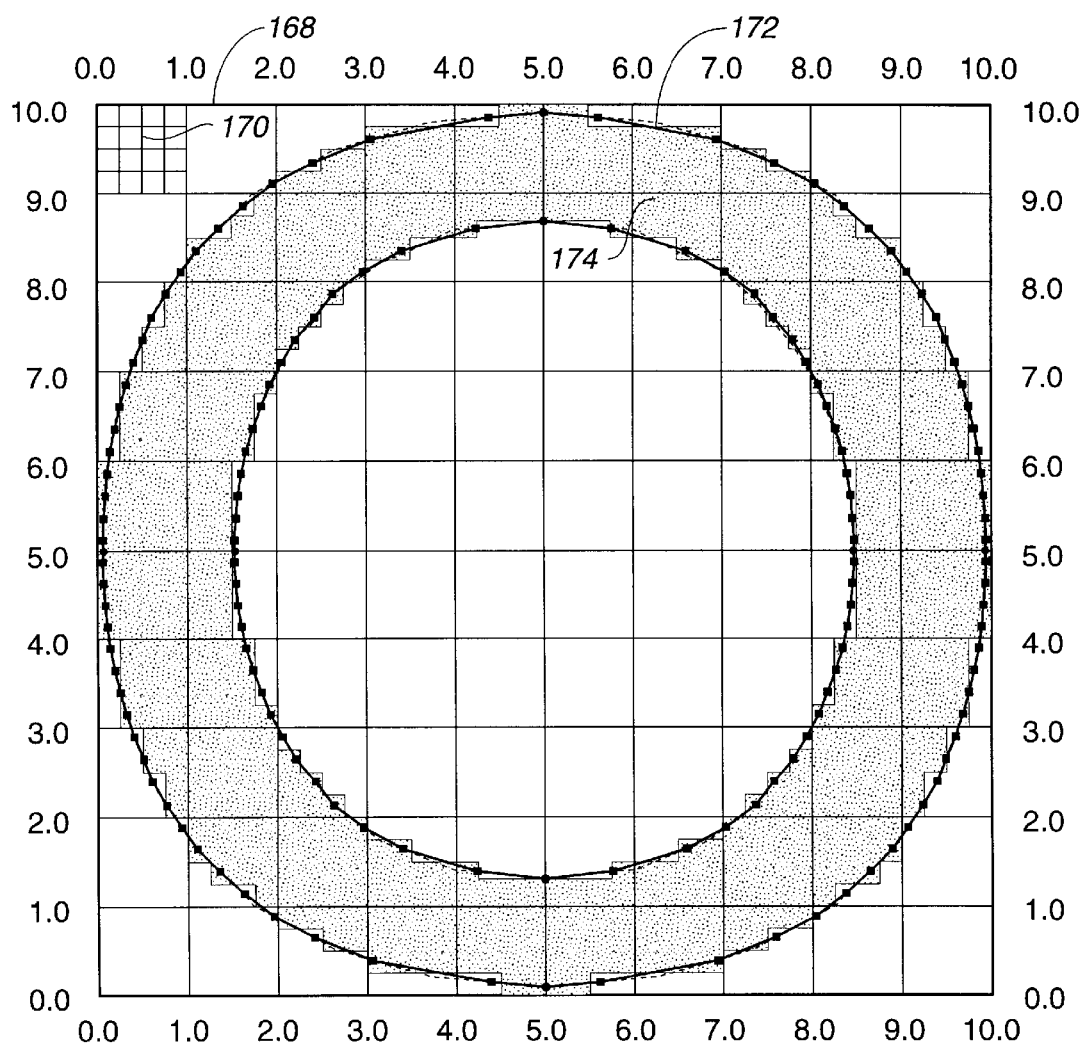
FIG._10A

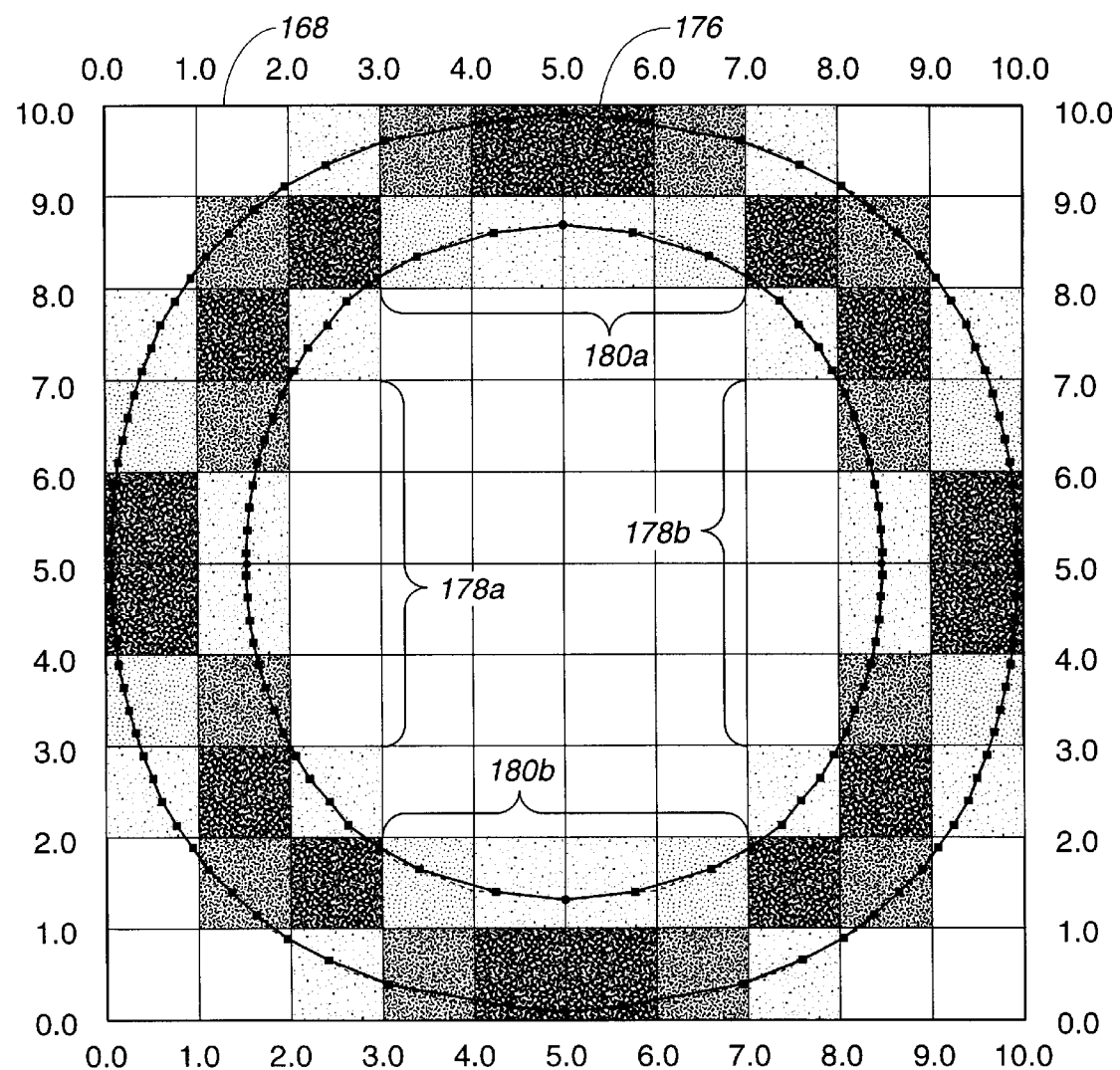
FIG._10B

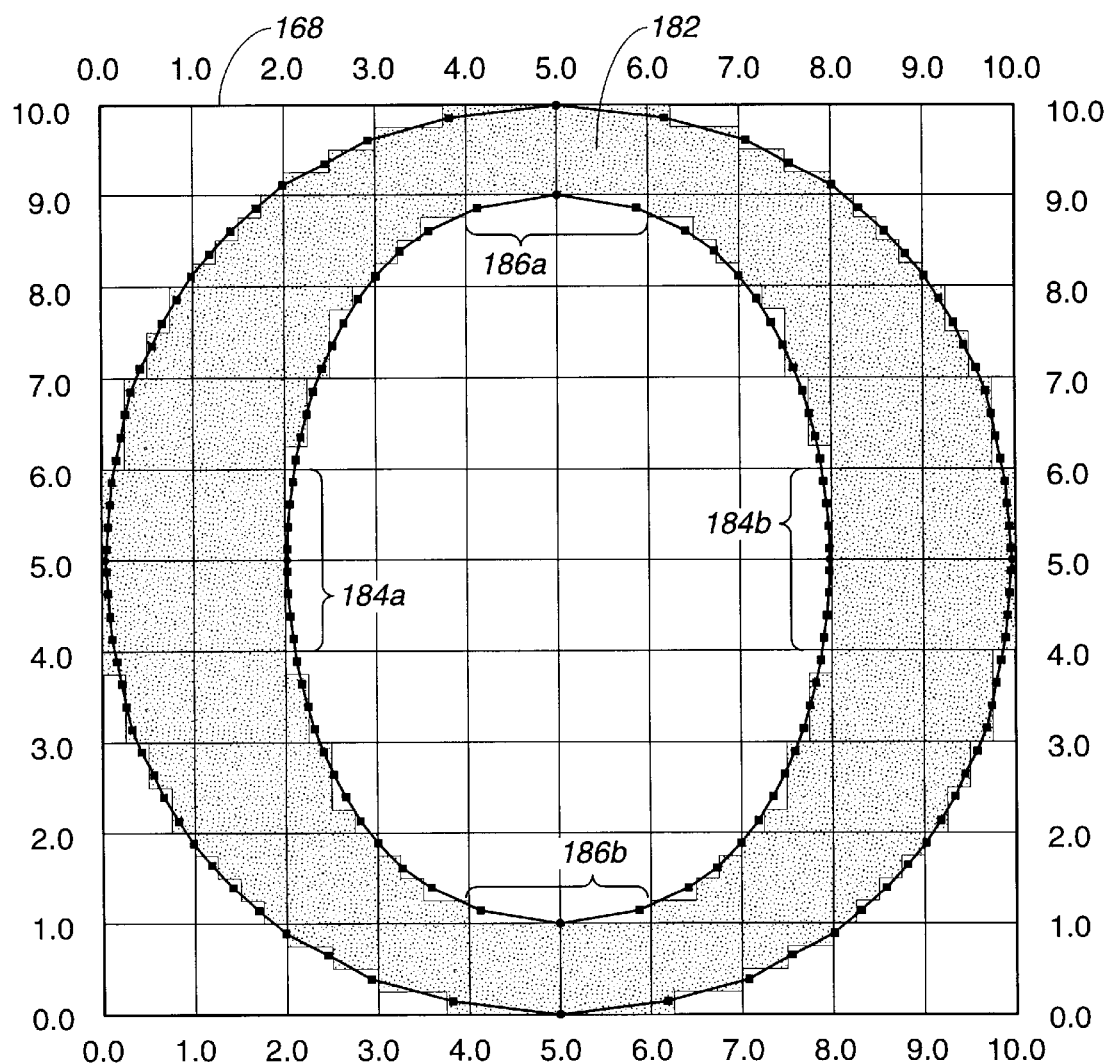
FIG._10C

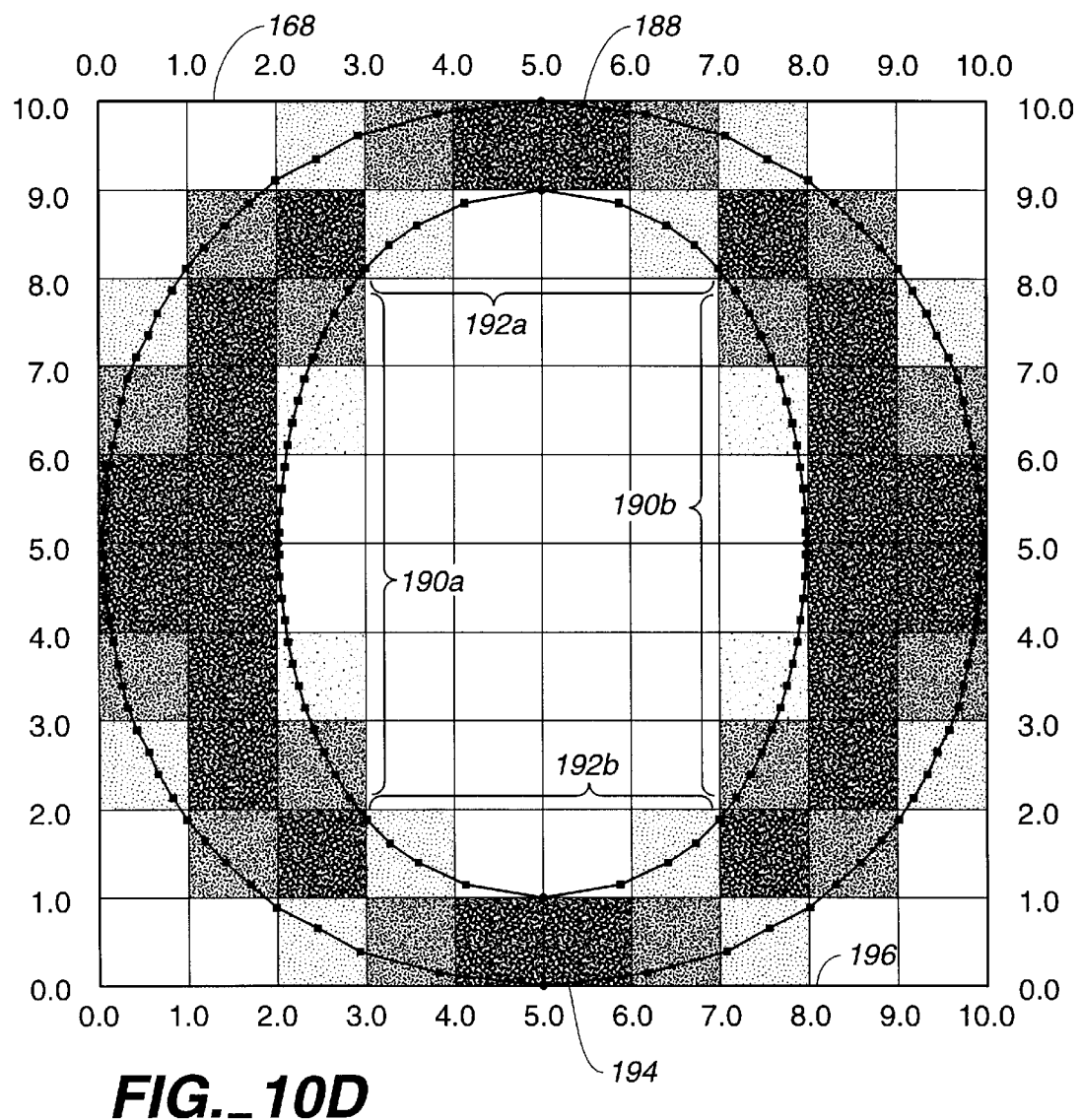
FIG._10D

METHOD AND APPARATUS FOR RENDERING CHARACTERS

TECHNICAL FIELD

This invention relates generally to computer systems, and more particularly to the rendering of characters to be displayed on computer output devices.

BACKGROUND ART

Computer systems typically include some form of visual output device. For example, in FIG. 1, a prior art computer system 10 includes a computer 12, a keyboard 14, a disk storage unit 16, a video display 18, and a printer 20. Of course, a computer system can include more or less components than that illustrated in computer system 10, as will be appreciated by those skilled in the art of computer design.

The computer 12 includes a central processing unit (CPU) 22, read only memory (ROM) 24, random access memory (RAM) 26, and input/output (I/O) 28. The various components 22–28 of the computer 12 are coupled together for communication by a bus system 30. As will be appreciated by those skilled in the art, the representation of the computer 12 has been highly simplified for the purposes of this discussion, but includes the fundamental components of a computer and their interconnections.

Devices such as keyboard 14, disk storage 16, video display 18, and printer are often referred to as "peripheral" devices. When coupled to the computer 12 they become part of the computer system 10. Some peripheral devices are primarily for inputting information to the computer 12, other peripheral devices are used for outputting information from the computer 12, and some computer peripherals are used for both inputting and outputting information.

The video display 18 and printer 20 are common output devices for the computer 12. Such output devices typically form temporary or permanent images to convey information to the user of the computer system 10. For example, the video display 18 will include a screen that can display character, graphical, and other types of images. Similarly, printer 20 can print (i.e., make a "hard copy") of characters, graphics, and other types of images.

Certain types of visual output devices for computer systems 10 are capable of outputting in "greyscale." What this means is that each of the pixels in the raster matrix of the output device is capable of displaying a number of tones, typically from pure light to pure dark. Most modern monochrome and color video displays, video projection units, and high-end continuous-tone black and white and color printers are capable of displaying greyscale. Older printers, blank and white monitors, and certain other types of output devices such as some LCD displays, are typically not capable of displaying in greyscale.

A number of problems present themselves when displaying characters on a computer output device. It should be noted, as used herein, that the term "character" is not limited to alphanumeric characters, but includes any form of character, number, symbol, or other coded device that can be represented or displayed on a computer output device. Some of these problems have to do with the resolution of the output device, and other problems have to do with human visual perception. By "resolution", as it is used herein, refers to the size of individual pixels of a computer output device, and the spacing between the pixels of the output device.

The problems inherent in character imaging tend to be more pronounced for small characters than for larger characters. This is because small characters are made up of fewer pixels and, therefore, even a distortion of a few pixels is readily apparent in smaller characters. Some of the distortions that may occur, particularly in these smaller characters, is unbalanced "stem" weights, the disconnection of thin features, the closing of "counters", over/under filling, and to inaccurate weighting. One of the most noticeable of these defects is unbalanced stem weights, where vertical and horizontal strokes of characters may be of varying widths due to inaccuracies caused by the character rendering process. Another very noticeable defect is the inaccurate weighting effect of small characters due to a quantization effect. In other words, adding a pixel (the "quantum") to a character stem that is only a few pixels wide can distort the "weight" given to that character, e.g. it may appear to be "bold" even when it is a normal weight character.

In FIG. 2A, the prior art problem of unbalanced stem weights is illustrated. In this instance, a lower case letter "m" is shown superimposed over a high-resolution grid 32 both in an outline form 34, and a "bitmap" form 36. By "bitmap", it is meant that a one-to-one mapping is made between data stored in the memory of the computer 12 and an image of the character to be displayed, i.e. each pixel of the output device corresponds to a bit of information stored in the computer. The outline 34 is typically provided by a parsed font program such as described in Adobe Type I format, Version 1.1, available from Adobe Systems, Inc. of Mountain View, Calif., often referred to as the "Black Book" due to the color of its cover. This character outline 34 is converted or "rendered" into the bitmap 36 by a rendering program or "renderer" available from a variety of sources, including Adobe Systems, Inc.

It should be noted in FIG. 2A that the letter "m" has already picked up some distortions by being converted from its font outline 34 to the bitmap 36. In particular, the three vertical legs or "stems" of the letter "m" are of different widths. As noted, the left stem 38a is two pixels wide, the middle stem 38b is one pixel wide, and the right stem 38c is two pixels wide.

It should be noted that while characters are often rendered on a high-resolution grid as illustrated in FIG. 2A, they must be converted into a "coarse grid" representation before they can be displayed on the output device. The resolution of the coarse grid corresponds to the resolution of the output device.

In FIG. 2B, the conversion from a high-resolution grid to a coarse grid permits the renderer to re-balance the stems. More particularly, the system uses "hints" provided by the parsed font program to stretch and then align the stems of the character to the coarse grid. As noted, in FIG. 2B, the stems 40a, 40b, and 40c are all the same width and, therefore, the unbalanced stem problem has been solved for black-and-white types of output devices.

While the prior art has solved the problem of unbalanced stem widths for black and white output devices, the problem has re-emerged for greyscale output devices. This is because greyscale output devices use a technique known as "anti-aliasing" in order to provide the illusion of smoother curves and less jagged diagonal lines. This is accomplished by varying the greyscale values of coarse grid. However, this greyscale manipulation re-introduces the problem of unbalanced stem widths to anti-aliased characters.

In FIG. 2C, the lower case letter "m" is shown against a coarse grid 42 and corresponding high-resolution grid 44. The high-resolution grid 44 is shown in only one of the cells of the coarse grid 42 so as not to confuse the drawings, although it will be appreciated that the high-resolution grid 44 is associated with all the cells of the coarse grid 42. The coarse grid and the high-resolution grid are related as follows. If the output device has $2^n+1$ greyscale values, each "cell" 46 of the coarse grid 42 will have $2^n$ pixels 48. To provide a more concrete example, if 17 greyscale levels are provided from pure white to pure black, then $2^4$ or 16 pixels of the high-resolution grid are in each cell of the coarse grid 42. This means that the resolution of the high-resolution grid 44 is four times the resolution of the coarse grid 42. As before, the font outline 50 for the letter "m" is obtained, and a bitmap 52 is developed at the resolution of the high-resolution grid from the font outline 50 by the renderer.

In FIG. 2D, the bitmap map 52 has been converted into a greyscale "pixel map" values which can be sent to the output device. This is usually accomplished in a straightforward fashion. The number of pixels for a particular cell are counted, and this number is mapped to the greyscale level for that cell. Therefore, cells having more pixels will correspond to a darker greyscale value than cells having fewer pixels. This technique, referred to as "anti-aliasing", greatly smooths the appearance of curves and reduces the jaggedness of diagonal lines, as is well known to those skilled in the art.

As used herein, a "pixel map" is much like a "bitmap" except that multiple values are stored in the memory of the computer system 12 to corresponds to each pixel of the output device. For example, for each pixel on a greyscale or color video monitor, multiple numeric values are stored on the computer to correspond to the multiple greyscales levels for each of the video monitor's pixels.

It will be noted, however, that the imbalanced stem problem has reoccurred in greyscale output devices as a result of the "anti-aliasing" process that was designed to make curves smoother and diagonal lines less jagged by adjusting the greyscale levels of selected pixels on the output display. More particularly, stem 54a appears to be two pixels wide, while stems 54b and 54c appear to be about one pixel wide. Again, this stem imbalance phenomenon is quite apparent in small characters and reduces the quality of the output image.

It should be noted that while this discussion has centered on vertical stems, that the problem is equally apparent with horizontal stems. For example, while the example of the lower case "m" was given, this stem imbalancing problem is also apparent on letters such as an upper case "E." Furthermore, both vertical and horizontal "stems" or segments can be found in a single letter, such as the letter "o", which has two vertical side segments or stems, and two horizontal top and bottom segments or stems.

FIGS. 3A, 3B, and 3C are used to illustrate both vertical "stems" and horizontal "stems" on the same character "o." In FIG. 3A, coarse grid 56 is shown with the font outline 58 of a character "o" and with its resultant bitmap 60. It should be remembered that while the font outline 58 has been rendered as a high-resolution bitmap 60, the actual output device can only display at the resolution of the coarse grid 56, which is ¼ the resolution of the high-resolution bitmap of this example.

As seen in FIG. 3B, this is not much of a problem with respect to a black-and-white output device. With such a device, the high-resolution bitmap 60 of FIG. 3A is converted into a coarse bitmap 62 which corresponds to the resolution of the output device. The coarse bitmap is aligned with the coarse grid such that the vertical stems 62a and 62b are of the same width, and such that the horizontal stems 64a and 64b are of the same width. As noted above, and in accordance with industry convention, a "stem" can be a portion of a curved letter, such as portions or segments of the letter "o." It should be further noted that the stems should be symmetrically balanced, and are not necessarily all of the same width. For example, in the Helvetica™ font, the vertical stems 62a and 62b are of a greater width than the horizontal stems 64a and 64b, in accordance with the design of the font developer. "Helvetica" is a trademark of Linotype AG and/or its subsidiaries.

In FIG. 3C, when anti-aliasing has been used to smooth the appearance of the letter "o", stem imbalancing is introduced. In particular, the horizontal stems 66a and 66b are quite different in width. In this particular example, the horizontal stems 68a and 68b are roughly balanced, although this is not always the case. It should also be noted that a portion of the greyscale pixel map 70 is below the "baseline" 72 for the character. This also has a distorting effect and should be avoided if possible.

Some attempt has been made by output device manufacturers to enhance the image provided to the output device as a bitmap or a pixel map. For example, certain Hewlett-Packard Company printers provide "image enhancement" which attempts to smooth "jagged" diagonal lines and to smooth curves. While generally useful, such post-rendering image enhancement mechanisms are not completely successful because the information that was used to create the bitmap or pixel map (e.g. the font outline) is not available to the output device. Therefore, post-rendering image enhancement cannot correct problems such as imbalanced stem widths, etc.

DISCLOSURE OF THE INVENTION

The present invention provides a method for creating anti-aliased characters on a computer output device without creating stem-width distortions in the characters. More particularly, the present invention balances the stem widths while still providing all of the curve smoothing and anti-jagging advantages of anti-aliasing.

More particularly, a method for creating anti-aliased characters on a computer output device includes the steps of generating a call from a client process for a particular character to be rendered, rendering the character at a high-resolution with a character rendering program, aligning stems of the high-resolution bitmap of the character with a coarse grid, creating an anti-aliased greyscale pixel map from the coarse grid aligned high-resolution bitmap, and creating an image of the character on the output device based upon the pixel map.

The step of generating a call from the client process preferably includes an identification of the character to be rendered, the size of the character, and the number of greyscales used to display the character. The step of aligning the stems of the high-resolution bitmap representation of the character with the coarse grid ensures that the stems of the character will remain balanced even after anti-aliasing.

A method for rendering a character in accordance with the present invention includes a step of determining a device resolution and a number of greyscales to be displayed by a digital output device. Next, a coarse grid is developed having a matrix of cells, where each cell is about the same resolution as the device resolution, and therefore, where each cell corresponds to a pixel of the output device. A high-resolution grid having a matrix of pixels is also developed, where the high-resolution grid is aligned with the coarse grid, the number of high-resolution pixels per cell being determined by the number of greyscales. Next, character information concerning a character to be rendered is developed, and an initial bitmap of the character is developed from the character information at the resolution of the high-resolution grid. Finally, stems of the initial bitmap are aligned with the coarse grid to create a high-resolution bitmap for subsequent processing. Of course, description of the steps of developing the coarse grid and the high-resolution grid are for human perceptual purposes, as such processes are unnecessary within the computer system, which operates internally on mathematical principals rather than visual principals.

The step of aligning the stem edges is preferably determined by a policy including at least a hard-edge policy and a soft-edge policy. The step of aligning the stems in accordance with the hard-edge policy includes the steps of rounding the stem widths to the closest multiple of the coarse grid, and centering each of the stems to the coarse grid. A method for aligning the stems in accordance with a soft-edge policy includes the steps of rounding the stem widths to the closest multiple of the high-resolution grid, and then aligning the stem widths with the coarse grid. For both the hard-edge and soft-edge policies, the final alignment is with the coarse grid so that the stem widths can be properly balanced.

A digital system having anti-aliased greyscale outputs includes a computer system having an output device, a client process executing on the computer system for generating a call for a character to be rendered. The client process typically provides an identification of the character to be rendered, the size of the character, and the number of greyscales used to display the character. The digital system also includes a renderer to convert the character from a character outline to a high-resolution bitmap of the character, and for aligning stems of the bitmap representation of the character with a coarse grid corresponding to a device resolution of the output device. The client process creates an anti-aliased greyscale pixel map from the coarse grid aligned high-resolution bitmap of the character, and the computer output device displays the character on a screen, prints it on paper, etc., based upon the pixel map.

A character renderer in accordance with the present invention for generating a high-resolution bitmap useful for displaying an anti-aliased character on an output device includes a grid generator, a character information developer, a bitmap generator, and a stem aligner. The grid generator generates a coarse grid having a matrix of cells where each cell is about the same resolution as an output device resolution, and further generates a high-resolution grid having a matrix of high-resolution pixels. Again, the grid is more conceptual than physical in nature, and are used to describe the conceptual operation of the renderer. The bitmap generator operates on the character information to create an initial high-resolution bitmap of the characters from the character information. The stem aligner aligns the stems of the high-resolution bitmap with the coarse grid to create an aligned high-resolution bitmap.

An advantage of the present invention is that the technique of anti-aliasing can be used to smooth curves and prevent jagged diagonal lines without introducing certain distortions into the image of the character being displayed. The invention accomplishes this task by aligning the high-resolution bitmap of the character with coarse grid during the rendering process, i.e., while there is still sufficient character information available to take care of problems such as imbalanced stem widths and quantization distortions.

These and other advantages of the present invention will become apparent upon reading the following detailed descriptions and studying the various figures of the drawings.

BRIEF DESCRIPTION OF THE DRAWINGS

FIG. 1 is a block diagram of typical prior art computer system, which is also a suitable host for the method and apparatus of the present invention;

FIG. 2A is a view of a prior-art high-resolution bitmap for the letter "m";

FIG. 2B is a view of a prior-art bitmap of the letter "m" that has been stretched and aligned with a coarse grid such that when it is displayed on a black and white output device it will appear to have balanced stem widths;

FIG. 2C illustrates the letter "m" rendered in a high-resolution bitmap;

FIG. 2D illustrates the imbalanced stem widths that result in providing an anti-aliased version of the bitmap of FIG. 2C;

FIG. 3A illustrates a high-resolution bitmap of the letter "o";

FIG. 3B illustrates the conversion of the high-resolution bitmap of FIG. 3A to a low-resolution bitmap for a black and white output device;

FIG. 3C illustrates a pixel map for a greyscale output device of the prior art that was derived from the bitmap of FIG. 3A;

FIG. 4 is a flow-diagram of a method for creating anti-aliased characters with balanced stem widths in accordance with the present invention;

FIG. 5 is an illustration of the "RECEIVE CALL FROM CLIENT" step of FIG. 4;

FIG. 6 is a flow-diagram of the "ALIGN STEMS" step of FIG. 4;

FIG. 7 illustrates the "ROUND STEM WIDTH TO COARSE GRID" and "CENTER STEM TO COARSE GRID" steps of FIG. 6;

FIG. 8 illustrates the "ROUND STEM WIDTH TO HIGH-RESOLUTION GRID" and "ALIGN LEFT/BOTTOM AND TOP/RIGHT TO COARSE GRID" steps of FIG. 6;

FIG. 9A, 9B, 9C, and 9D are used to illustrate a first example of the method of the present invention; and FIGS. 10A, 10B, 10C, and 10D are used to illustrate a second example of the method of the present invention.

BEST MODES FOR CARRYING OUT THE INVENTION

The present invention preferably includes processes executing ("running") on a computer system such as the computer system 10 illustrated in FIG. 1. However, as will be well appreciated by those skilled in the art, the processes and apparatuses described herein can also be implemented by hardware or firmware equivalents. For example, many font rendering and other display processes are embedded in application specific integrated circuits (ASICs), as is well known to those skilled in the art.

FIGS. 1, 2a–2d, and 3a–3c were discussed relative to the prior art. In FIG. 4, a process 74 in accordance with the present invention for creating a high-resolution bitmap to create anti-alias characters on a computer output device begins at 76 and, in a step 78, receives a call from a client with a character pointer, size, number of greyscales, and policy. As used herein, a "client" is an application program, utility, or other process that is requesting a high-resolution bitmap that can be further processed and displayed on an output device. For example, a client might be a word processing program. Alternatively, the client might be part of a greater "renderer."

Next, in a step 80, the process aligns stems of the character based upon the policy dictated by the client and by the number of greyscales specified by the client. As will be discussed in greater detail later, this policy includes whether the character should be "hard-edged" or "soft-edged", which may sometimes be referred to as "hard" or "soft" policies, respectively. This policy can be selected dynamically by the renderer, the client, or can be predetermined by the creator of the render.

The number of greyscales is typically either defined by the client or by the user of the computer system. For example, it is often possible to specify that an output is to be displayed in black-and-white (i.e. with two values only), at four greyscale shades, at sixteen greyscales shades, at 256 greyscale shades, etc.

After the stems of the character have been aligned, controls are set for resolution-dependent properties based on the number of greyscales in a step 82. For example, device dependent property adjustments, such as spot size (ratio of apparent pixel size to physical pixel size), can be handled in this step 82, as will be appreciated by those skilled in the art. Finally, a high-resolution bitmap is provided to the client in step 84. Typically, the client takes care of the greyscale rendering of the high-resolution bitmap, although such greyscale rendering can also be accomplished within the rendering process itself as mentioned previously. The process is then complete as illustrated at 86.

FIG. 5 is used to illustrate step 78 of FIG. 4 in greater detail. More particularly, an enhanced font renderer 88 of the present invention receives a call 89 from a client 90 which includes a character pointer, a character size, the number of greyscales, and the policy. The renderer 88 creates a call 91 to a parsed font program 92 which returns a character program (to create the font outline of the character), font values, and font family values as illustrated at 93. The enhanced font renderer 88 then passes a high-resolution bitmap as illustrated at 95 to the client 90, which does the greyscale rendering and which sends a low resolution pixel map 96 to an output image device 94.

As explained above, the client 90 can be any application program, utility, or other computer-implemented process capable of requesting that a character be displayed on the output device 94. The parsed font program is preferably a font program such as Adobe-type I format available from Adobe Systems, Inc. of Mountain View, Calif. A complete description of the use and operation of a parsed font program 92 can be found in the "Black Book", supra.

It is readily apparent to those skilled in the art and with knowledge of the contents of the "Black Book" how clients such as client 90 make calls to renderers, and receive high-resolution bitmaps back from the renderers, and further, how client 90 can produce a pixel map from the high-resolution bitmap for the output device 94. The use of a parsed font program 92 is also well known to those skilled in the art, along with the receipt of calls from a renderer, and the providing of the character program, font values, and font family values.

In FIG. 6, the step 80 of FIG. 4 is illustrated in greater detail. More particularly, process 80 begins at 98 and, in a step 100, the current font matrix and stem properties are received from the parsed font program 92. Details of the is operation are again explained in the "Black Book." Next, the stem properties are transformed with the matrix to obtain device grid locations of the stem edges and stem widths in a step 102.

In a step 104, it is determined whether the policy is a "hard-edge" or a "soft-edge" policy. A hard-edge or "hard" policy is one wherein vertical and horizontal stems are made perfectly black, i.e., greyscale is not used. In a hard-edge policy, only curves and diagonals are subject to greyscale-type anti-aliasing techniques. In contrast, soft-edge or "soft" policies permit anti-aliasing of the horizontal and vertical stems.

Whether hard-edge or soft-edge policies are adopted may be chosen by the client or left to the discretion of the renderer. Hard-edge policies tend to make sharper, darker stems, but may suffer from some of the quantization effects noted earlier. Soft-edge policies appear to be smoother, but may seem "fuzzy" to some viewers.

If a hard-edge policy is chosen, step 106 rounds the stem width to an integral coarse grid. By "integral" it is meant an integral multiple of a cell width is chosen, i.e. 0, 1, 2, 3, etc. multiples of the cell width. Next, in a step 108, the stem is centered to the coarse grid and the process is completed at 110.

If a soft policy is selected as detected by step 104, a step 112 rounds the stem width to an integral high-resolution grid, and then a decision step 114 determines whether the stem is a "ghost" stem. The term "integral" is used in a similar fashion here to mean integer multiples of the high-resolution grid pixels, i.e. 0, 1, 2, 3, etc. multiples of the high-resolution grid pixels. "Ghost" stems are discussed in the aforementioned "Black Book" and, briefly, are stems that have only one edge to control.

If the stems are not ghost stems, a step 116 determines the proximity of the stem to the grid and, if it is closer to the left/bottom of the grid, it is aligned with the left/bottom of the coarse grid based on this proximity. If step 116 determines that it is closer to the top/right of the cell, it is aligned to the top/right of the coarse grid cell based on its proximity.

If step 114 determines that the stem is a ghost stem, a decision step 122 determines the type of ghost stem. If it is a left/bottom ghost stem, it is aligned with a left/bottom of the coarse grid cell based on this ghost information. If it is a top/right ghost stem, it aligns to the top/right of the coarse grid cell based on this ghost information in the step 126. Note that this adjustment is not proximity determined as in step 116, but rather directed by the "ghost" hint itself. After the completion of any of steps 118, 120, 124, and 126, the process is completed as illustrated at 10.

In FIG. 7, an illustration is made to help explain the hard policy steps 106 and 108 of FIG. 6. In FIG. 7, a coarse grid 128 will be assumed for the purposes of example to have cells 130 that are square and which are four pixels on each side. An "ideal" spot 132 is shown to be partially within cell 130a, and also partially within an adjacent cell 130b. The center of this ideal spot 132 is shown at 134.

At this point it should be noted that there are some device-dependent and some designer-dependent decisions that can be made. For example, the decision as to how to align the ideal spot 132 with the coarse grid 128 very much depends upon the type of output device used and upon designer decisions. For example, most first generation personal computer printers use the "Canon" print engines manufactured by Canon, Inc. of Japan. With these first generation printers, a round pixel is printed that completely covers the cell of the coarse grid, i.e. the round pixel has a diameter that is about equal to a diagonal of the cell of the grid.

In recent years, a number of new types of print engines have been developed. For example, a "Xerox" engine manufactured by Xerox, Inc. of the United States produces a pixel having four concave sides such that the pixel fits entirely within the cell of the coarse grid. As a result, three pixels produced by a Canon engine can cover 3.8 cells of the coarse grid, while four pixels produced by a Xerox engine can cover 3.7 cells of the coarse grid.

With the foregoing explanation in mind, a step 108 of FIG. 6 will be discussed as if an output device can produce a perfectly square pixel corresponding to the square cell 30 of the coarse grid 128, it being understood that this is only an approximation of the reality. As seen in FIG. 7, if the ideal spot 132 is less than 6 pixels ("6–" pixels), it will be shrunk to four pixels in width and aligned with the cell 130a. However, if the spot 132 is greater than 6 pixels ("6+" pixels), it will be increased to 8 pixels in width and will be caused to fill both cells 130a and 130b. In the first instance, the center of the spot 132' is at 134' (i.e. the center of cell 138), and in the other instance the spot 132" has a center 134" which is at the interface between cells 130a and 130b. In this way, the spot 132 is aligned to the coarse grid 128 such that the balance of stem weights is preserved.

In FIG. 8, the soft-edge policy is illustrated. More particularly, FIG. 8 illustrates the steps 112, 118, 120, 124, and 126 of FIG. 6. As seen in FIG. 8, an ideal spot 136 has a center 138 and is associated with a coarse grid 140 and a high-resolution grid 142. As before, the high-resolution grid is shown in only one of the cells 144 of the coarse grid 140 so as not to confuse the drawings, although it will be appreciated that the high-resolution grid 142 is associated with all the cells of the coarse grid 140.

In accordance with the "soft-edge" policy, step 112 first rounds the stem width to an integral high-resolution grid 142. In this instance, a side of a high-resolution grid pixel is ¼ of a side of a cell 144. Therefore, the width of the stem 134 is rounded to the nearest ¼ of a coarse grid cell in a step 112. Next, it is determined which cells of the coarse grid 140 the rounded stem width is to be aligned with. This is the purpose of steps 114, 116, and 122. When the proper coarse grid cell is found, the rounded stem is aligned accordingly.

In this example, the spot 136 is somewhat centered within a cell 144a and 144b. If it is determined that the rounded stem is to be aligned to the left cell, it is moved as indicated to the position 136' such that it completely fills the cell 144a and overlaps partially the cell 144b. If, on the other hand, it is to be aligned with the right cell, it is moved so that it completely fills the cell 144b and partially overlaps with the cell 144a.

By analogy, if the stem 136 is only partially overlapping the cell in the vertical direction, it can be aligned to the top or bottom of the cell of the coarse grid in a similar fashion. Furthermore, if it only partially overlaps a cell both in the vertical and horizontal direction, it can be caused to move to align with the cell of the coarse grid both in the left/bottom and top/right directions. Therefore, both horizontal and vertical stems can be handled by the process and apparatus of the present invention.

The foregoing descriptions and illustrations describe the basic process and apparatus of the present invention. As mentioned previously, the process of the present invention is preferably practiced on a general-purpose computer system to provide images on an output device such as a video monitor, a video projection system, or a continuous-tone printer. The process and apparatus of the present invention will be further discussed in terms of two illustrative examples.

EXAMPLE 1

The Lower Case Letter "m"

In FIG. 9a, the font outline 148 of the letter "m" is shown superimposed over a coarse grid 146. A high-resolution bitmap 150 is created from this font outline 148. It will be noted that the high-resolution bitmap 150 is aligned with a high-resolution grid 152.

FIG. 9b illustrates the pixel map as created in accordance with the "soft-edge" policy of the present invention. The high-resolution bitmap 150 is first rounded with respect to high-resolution grid 152, and is then aligned with the coarse grid 146 as described above. Then the pixel map 154 is created by this rounded and aligned bitmap to provide the appropriate greyscale data for the output device. As can be seen, the stems 156a, 156b, and 156c are all of the same width and have about the same pixel density. This will provide an anti-aliased output, while still preserving stem width balance.

The "hard-edge" policy will be described with reference to FIG. 9c. In this instance, the data as illustrated in FIG. 9a is "stretched" such that each of the stems 158a, 158b, and 158c have the width of a cell 160 of the coarse grid 148. This is in accordance with steps 106 and 108 of FIG. 6. Next, the "stretched" bitmap 160 of FIG. 9c is converted to the greyscale pixel map 164 of FIG. 9d. Note, once again, that the stems 166a, 166b, and 166c of the pixel map 164 are of the same width and, substantially of the same density. This allows the letter "m" to be anti-aliased while preserving its stem weight balance.

EXAMPLE 2

The Lowercase Letter "o"

In FIG. 10a, a "o" is superimposed over a coarse grid 168 and a high-resolution grid 170. More particularly, a font outline 172 is used to create a fine bitmap 174 of the letter "o." It should be noted that since the font being illustrated is from the "Helvetica" family, and that the top and bottom of the "o" are thinner than the two sides of the "o."

FIG. 10b illustrates a pixel map 176 created from the bitmap 174 of FIG. 10a in accordance with the soft-edge policy. As described previously, the soft-edge policy first rounds the stems to the high-resolution grid 170 and then aligns the rounded stem with the coarse grid 168. As noted in FIG. 10b, this results in a pixel map having a left stem 178a that is substantially equivalent to the right stem 178b while having a top stem 180a substantially equivalent to a bottom stem 180b. Therefore, this anti-aliased rendering of "o" has preserved the stem weight balance both in the horizontal and vertical directions in accordance with the present invention.

In FIG. 10c, a stretched bitmap 182 is created from the bitmap 174 of FIG. 10a in accordance with the "hard-edge" policy. As noted, the left and right stems 184a and 184b have been stretched so that they fully fill the four cells of the stem, while the top stem 186a and the bottom stem 186b have been similarly stretched to fill the two top and the two bottom cells of the coarse grid 168. This is in accordance with the rounding to the integral course grid and coarse grid aligning steps discussed previously.

In FIG. 10d, the bitmap 182 has been converted into a greyscale pixel map 188 as described previously. It should noted that the left stem 190a and right stem 190b are balanced, as are the top stem 192a and the bottom stem 192b. It should also be noted that the bottom 194 of the character "o" does not go below the base line 196 of the coarse grid 168.

While this invention has been described in terms of several preferred embodiments, there are alterations, permutations, and equivalents which fall within the scope of this invention. It should also be noted that there are may alternative ways of implementing both the process and apparatus of the present invention, and that certain concepts were introduced for the purpose of instruction and clarity.

For example, as described previously, coarse and high-resolution grids are preferably not actually "constructed" within the process but, rather, are used herein to explain the concepts of the present invention. Also, as will be appreciated by those skilled in the art, the order of steps can often be changed, and certain steps have been simplified for the purpose of clarity. For example, the step of "rendering a high-resolution bitmap" is preferably implemented by first developing a high-resolution "hintmap", providing adjustments to the hintmap, and then rendering the actual pixels of the high-resolution bitmap. The "hintmap" is simply a high-resolution representation of the grid-fit alignment zones of the character, as will be appreciated by those skilled in the art. Alternatively, the high-resolution bitmap rendering step can be the single step described above.

It is therefore intended that the following appended claims be interpreted as including all such alterations, permutations, and equivalents as fall within the true spirit and scope of the present invention.

I claim:

1. A method creating anti-aliased characters on a computer output device comprising the steps of:

generating a call from a client process executing on a computer system for a character to be rendered, the client process providing an identification of the character to be rendered, a character program for that character, the size of the character and the number of greyscales to be used to display the character;

rendering the character by retrieving the character program for the character and aligning stems of the character with a coarse grid corresponding to a device resolution of an output device of the computer system, the step of aligning stems being based upon a high-resolution grid defined by the number of greyscales identified by the client process, and resulting in a high-resolution bitmap of the character corresponding to the high-resolution grid;

creating an anti-aliased greyscale pixel map at the size identified by the client process from the high-resolution bitmap of the character; and creating an image of the character on the output device at the device resolution based upon the anti-aliased greyscale pixel map.

2. A method for creating anti-aliased characters as recited in claim 1 wherein the step of rendering the character comprises:

calling a parsed font program to retrieve the character program, font values and font family values corresponding to the character;

executing the character program to determine the locations of stem edges of the character with respect to the coarse grid and to determine the stem widths; and aligning the stem edges with the coarse grid.

3. A method for creating anti-aliased characters as recited in claim 2 wherein the client process is further operative to provide a policy including a hard edge policy and a soft edge policy, and wherein the step of aligning the stem edges is determined by the policies provided by the client process.

4. A method for creating anti-aliased characters as recited in claim 3 wherein the step of aligning the stems in accordance with the soft-edge policy comprises the steps of rounding the stem widths to the closest multiple of the high-resolution grid, and aligning the stem widths with the coarse grid.

5. A method for creating anti-aliased characters as recited in claim 4 wherein the step of aligning the stems in accordance with a soft-edge policy is further dependent upon at least one of proximity and ghost stem information.

6. A method for creating anti-aliased characters as recited in claim 5 wherein if a stem is a ghost stem, the step of aligning stem widths with the coarse grid comprises the steps of:

for a left/bottom ghost stem, aligning the left/bottom of such stem to a left/bottom coarse grid edge; and for a right/top ghost stem, aligning the right/top of such stem to a right/top coarse grid edge.

7. A method for creating anti-aliased characters as recited in claim 5 wherein if a stem is not a ghost stem, the step of aligning stem widths with the coarse grid comprises the steps of:

determining a proximity of the stem to be either a left/bottom proximity, or a right/top proximity;

for a left/bottom proximity, aligning the left/bottom of such stem to a left/bottom coarse grid edge; and for a right/top proximity, aligning the right/top of such stem to a right/top coarse grid edge.

8. A method for rendering a character comprising the steps of:

determining a device resolution and a number of greyscales to be displayed by a digital output device;

determining a coarse grid having a matrix of cells, where each cell is about the same resolution as the device resolution and therefore corresponds to a device pixel of the digital output device;

determining a high-resolution grid having a matrix of high-resolution pixels, the high-resolution grid being aligned with the coarse grid such that each cell of the coarse grid includes an integral number of high-resolution pixels, the number of high-resolution pixels per cell being determined by the number of greyscales;

obtaining a character program for a character to be rendered;

creating an initial bitmap of the character from the character program at the resolution of the high-resolution grid; and aligning stems the initial bitmap with the coarse grid to create a high-resolution bitmap, the alignment being determined by a policy including a hard-edge policy and a soft-edge policy.

9. A method for rendering characters as recited in claim 8 wherein the step of aligning the stems in accordance with the hard edge policy comprises the steps of round the stem widths to the closest multiple of the coarse grid, and centering each the stems to the coarse grid.

10. A method for creating anti-aliased characters as recited in claim 8 wherein the step of aligning the stems in accordance with the soft-edge policy comprises the steps of rounding the stem widths to the closest multiple of the high-resolution grid, and aligning the stem widths with the coarse grid.

11. A method for creating anti-aliased characters as recited in claim 10 wherein the step of aligning the stems in accordance with a soft-edge policy is further dependent upon at least one of proximity and ghost stem information.

12. A method for creating anti-aliased characters as recited in claim 11 wherein if a stem is a ghost stem, the step of aligning stem widths with the coarse grid comprises the steps of:

for a left/bottom ghost stem, aligning the left/bottom of such stem to a left/bottom coarse grid edge; and for a right/top ghost stem, aligning the right/top of such stem to a right/top coarse grid edge.

13. A method for creating anti-aliased characters as recited in claim 11 wherein if a stem is not a ghost stem, the step of aligning stem widths with the coarse grid comprises the steps of:

determining a proximity of said stem to be either a left/bottom proximity, or a right/top proximity;

for a left/bottom proximity, aligning the left/bottom of such stem to a left/bottom coarse grid edge; and for a right/top proximity, aligning the right/top of such stem to a right/top coarse grid edge.

14. A digital system having anti-aliased greyscale output comprising:

a computer system including an output device;

client process means executing on the computer system for generating a call from a client process for a character to be rendered, the client process means providing an identification of the character to be rendered and a character program for that character, the size of the character and the number of greyscales to be used to display the character;

means executing on the computer system for rendering the character by retrieving the character program for the character and aligning stems of the identified character and aligning stems of the identified character with a coarse grid corresponding to a device resolution of the output device, the step of aligning stems being based upon a high-resolution grid defined by the number of greyscales identified by the client process, and resulting in a high-resolution bitmap of the character corresponding to the high-resolution grid;

creating an anti-aliased greyscale pixel map at the size identified by the client process from the high-resolution bitmap of the character; and creating an image of the character on the output device at the device resolution based upon the anti-aliased greyscale pixel map.

15. A digital system as recited in claim 14 wherein the means for rendering a character comprises:

means for calling a parsed font program to retrieve the character program, font values, and font family values corresponding to the character to be rendered;

means for executing the character program on the computer system to determine the locations of stem edges of the character with respect to the coarse grid and to determine the stem widths; and means for aligning the stem edges with the coarse grid.

16. A digital system as recited in claim 15 wherein the client process means is further operative to provide a policy including a hard edge policy and a soft edge policy, and wherein the step of aligning the stem edges is determined by the policy provided by the client process.

17. A digital system as recited in claim 16 wherein the means for aligning the stems in accordance with a hard edge policy comprises means for rounding the stem widths to the closest multiple of the coarse grid, and means for centering each of the stems to the coarse grid.

18. A digital system as recited in claim 16 wherein the means for aligning the stems in accordance with a soft-edge policy comprises means for rounding the stem widths to the closest integer multiple of the high-resolution grid, and means for aligning the stem widths with the coarse grid.

19. A digital system as recited in claim 18 wherein the means for aligning the stems in accordance with a soft-edge policy is dependent upon at least one of proximity and ghost stem information.

20. A digital system as recited in claim 19 wherein if a stem is a ghost stem, the means for aligning stem widths with the coarse includes:

means for aligning the left/bottom of such stem to a left/bottom coarse grid edge for a left/bottom ghost stem; and means for aligning the right/top of such stem to a right/top coarse grid edge for a right/top ghost stem.

21. A digital system as recited in claim 19 wherein if a stem is not a ghost stem, the means for aligning stem widths with the coarse includes:

means for determining a proximity of the stem to be either a left/bottom proximity, or a right/top proximity;

means for aligning the left/bottom of such stem to a left/bottom coarse grid edge for a left/bottom proximity; and means for aligning the right/top of such stem to a right/top coarse grid edge for a right/top proximity.

22. A character renderer for generating a high-resolution bitmap useful for displaying a character in greyscale on an output device, the character renderer comprising:

a grid generator for generating a coarse grid having a matrix of cells, where each cell is about the same resolution as the output device resolution, and for generating a high-resolution grid having a matrix of high-resolution pixels, the high-resolution grid being aligned with the coarse grid such that each cell of the coarse grid includes an integral number of high-resolution pixels, the number of high-resolution pixels per cell being determined by a number of greyscales associated with the output device;

a character program receiver for receiving a character program for a character to be displayed on the output device;

a bitmap generator that operates on the character program to create an initial bitmap of the character from the character program at the resolution of the high-resolution grid; and a stem aligner that aligns stems of the initial bitmap with the coarse grid to create a high-resolution bitmap by utilizing the character program.

23. A character renderer as recited in claim 22 wherein the character program receiver includes a routine caller that calls out a parsed font provider to retrieve the character program, font values, and font family values corresponding to the character to be rendered.

24. A character renderer as recited in claim 23 wherein the stem aligner is capable of operating with at least a hard-edge policy and a soft-edge policy.

25. A character renderer as recited in claim 24 wherein when the stem aligner aligns the stems in accordance with a hard edge policy, rounds the stem widths to the closest multiple of the coarse grid and centers each of the stems to the coarse grid.

26. A character a recited in claim 24 wherein the stem aligner aligns the stem in accordance with a soft-edge policy, rounds the stem widths to the closest multiple of the high-resolution grid and aligns the stem widths with the coarse grid.

27. A character renderer as recited in claim 26 wherein the stem aligner further operates in accordance with proximity and ghost stem information when operating in accordance with a soft-edge policy.

28. A character renderer as recited in claim 27 wherein if a stem is a ghost stem, the stem aligner aligns the left/bottom of such stem to a left/bottom coarse grid edge for a left/bottom ghost stem, and aligns the right/top of such stem to a right/top coarse grid edge for a right/top ghost stem.

29. A character renderer as recited in claim 27 wherein if a stem is not a ghost stem, the stem aligner determines a proximity of the stem to be either a left/bottom proximity, or a right/top proximity, aligns the left/bottom of such stem to a left/bottom coarse grid edge for a left/bottom proximity, and aligns the right/top of such stem to a right/top coarse grid edge for a right/top proximity.

* * * * *